US007123761B2

(12) United States Patent
Kawano

(10) Patent No.: US 7,123,761 B2
(45) Date of Patent: Oct. 17, 2006

(54) FEATURE EXTRACTING METHOD, SUBJECT RECOGNIZING METHOD AND IMAGE PROCESSING APPARATUS

(75) Inventor: Tsutomu Kawano, Tokyo (JP)

(73) Assignee: Konica Corporation, Tokyo (JP)

( * ) Notice: Subject to any disclaimer, the term of this patent is extended or adjusted under 35 U.S.C. 154(b) by 762 days.

(21) Appl. No.: 10/289,981

(22) Filed: Nov. 7, 2002

(65) Prior Publication Data

US 2003/0095698 A1    May 22, 2003

(30) Foreign Application Priority Data

Nov. 20, 2001  (JP) .............................. 2001-354986

(51) Int. Cl.
*G06K 9/00* (2006.01)
*G06K 9/34* (2006.01)
*G06K 9/48* (2006.01)
*G06K 9/46* (2006.01)

(52) U.S. Cl. ...................... 382/132; 382/170; 382/199; 382/203

(58) Field of Classification Search ................ 382/128, 382/130, 132, 170, 171, 181, 190, 195, 199, 382/203, 224
See application file for complete search history.

(56) References Cited

U.S. PATENT DOCUMENTS

| 5,072,384 | A | * | 12/1991 | Doi et al. .................. 382/132 |
| 5,319,551 | A | * | 6/1994 | Sekiguchi et al. .......... 382/131 |
| 5,452,367 | A | * | 9/1995 | Bick et al. .................. 382/128 |
| 5,506,913 | A | * | 4/1996 | Ibison et al. ................ 382/132 |
| 5,732,149 | A | * | 3/1998 | Kido et al. .................. 382/128 |
| 5,943,435 | A | * | 8/1999 | Gaborski .................... 382/132 |
| 6,055,326 | A | * | 4/2000 | Chang et al. ............... 382/132 |
| 6,058,322 | A | * | 5/2000 | Nishikawa et al. ......... 600/408 |
| 6,282,307 | B1 | * | 8/2001 | Armato et al. ............. 382/132 |
| 2002/0094113 | A1 | * | 7/2002 | Shinbata .................... 382/128 |

* cited by examiner

*Primary Examiner*—Bhavesh M. Mehta
*Assistant Examiner*—Anthony Mackowey
(74) *Attorney, Agent, or Firm*—Frishauf, Holtz, Goodman & Chick, P.C.

(57) ABSTRACT

A feature extracting method for a radiation image formed by radiation image signals each corresponding to an amount of radiation having passed through a radiographed subject, has plural different feature extracting steps, each of the plural different feature extracting steps having a respective feature extracting condition to extract a respective feature value; a feature value evaluating step of evaluating a combination of the plural different feature values; and a controlling step of selecting at least one feature extracting step from the plural different feature extracting steps based on an evaluation result by the feature value evaluating step, changing the feature extracting condition of the selected feature extracting step and conducting the selected feature extracting step so as to extract a feature value again based on the changed feature extracting condition from the radiation image.

22 Claims, 13 Drawing Sheets

REDUCED (ORIGINAL) IMAGE

SUBJECT AREA IMAGE

: SUBJECT AREA

● : AREA BORDER POINT

◄——► : AREA WIDTH (1)

(2)

(1)

(2)

(1)

(2)

(1)

(2)

○ LUNG FIELD REGION  ● LUNG FIELD CONTOUR PROPOSED POINT

LUNG FIELD

FIG. 12 (a)
| -2 | 0 | 4 | 0 | -2 |
n = 1
FIG. 12 (b)
| -2 |
| 0 |
| 4 |
| 0 |
| -2 |
n = 2
FIG. 12 (c)
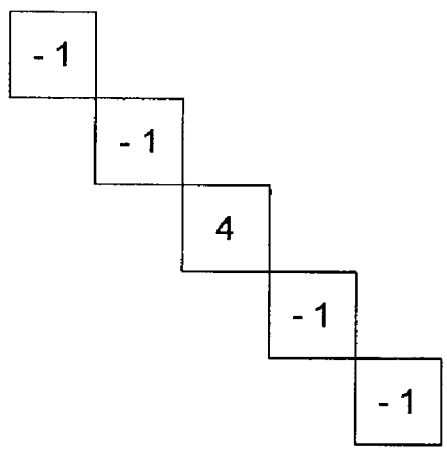
n = 3
FIG. 12 (d)
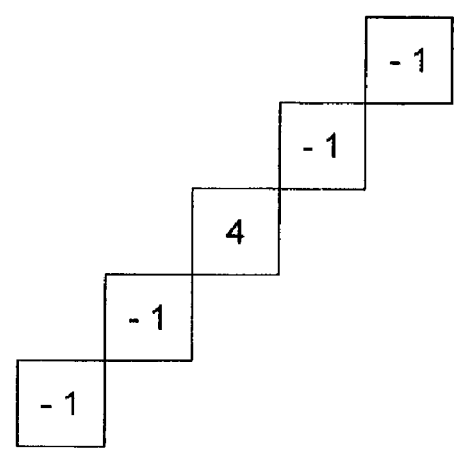
n = 4

CONTINUOUS EDGE

CONTINUOUS EDGE

CONCENTRATED EDGE

CONTINUOUS EDGE

CONCENTRATED EDGE

FEATURE EXTRACTING METHOD, SUBJECT RECOGNIZING METHOD AND IMAGE PROCESSING APPARATUS

BACKGROUND OF THE INVENTION

The present invention relates to a feature extracting method, a subject recognizing method and an image processing apparatus all for processing a radiation image, and in particular, to a feature extracting method, a subject recognizing method and an image processing apparatus which are capable of conducting feature extracting necessary for an optimum processing of radiation images.

In recent years, there has been developed an apparatus capable of radiographing a radiation image as a digital image directly. For example, TOKKAISHO Nos. 55-12429 and 63-189853 disclose a method employing a detector that uses a stimulable phosphor, as an apparatus wherein an amount of radiation irradiated on a subject is detected, and a radiation image that is formed depending on an amount of the detection is obtained as an electric signal.

In the aforementioned apparatus, radiation that has passed through a subject once is irradiated on a detector in which a stimulable phosphor is fixed on a sheet-shaped base board in a way of coating or vacuum deposition, so that the radiation may be absorbed in the stimulable phosphor.

After that, the stimulable phosphor is excited with light or heat energy so that radiation energy accumulated in the stimulable phosphor through the absorption stated above may be radiated as fluorescent light which is transferred photoelectrically to obtain an image signal.

On the other hand, there has been proposed an apparatus for detecting a radiation image which is obtained by generating electric charges corresponding to intensity of the radiation irradiated, then, by accumulating the generated electric charges in a plurality of capacitors arranged two-dimensionally, and by taking out the accumulated electric charges.

The radiation image detecting apparatus of this sort employs one called a flat panel detector (FPD). With respect to the FPD of this sort, there is known an object realized by combination of a phosphor that radiates fluorescent light corresponding to intensity of the irradiated radiation and a photoelectric transfer element such as a photodiode or CCD that receives fluorescent light radiated from the phosphor, directly or through a reduction optical system, to conduct photoelectric transfer, as described in TOKKAIHEI No. 9-90048.

As described in TOKKAIHEI No. 6-342098, there is also known the one wherein irradiated radiation is transferred directly into an electric charge.

In these apparatuses mentioned above, it is preferable that an image obtained by the apparatus is automatically transferred in terms of gradation, for the purpose of indicating a radiation image with a gradation that is suited to diagnoses, so that a portion (region of interest) targeted by a medical doctor may become easy to see.

For conducting the automatic gradation transfer of this sort, processing conditions are determined from statistical characteristics of image data (maximum value, minimum value and histogram or the like), such as a lookup table (LUT) wherein output signal values for input signal values are stipulated and gradation transfer processing is conducted for the total image.

Further, for making the structure of details to be easy to see, there are conducted edge enhancement processing and dynamic range compression processing for making both a high density portion and a low density portion to be observed simultaneously easily by narrowing a signal area of the subject.

However, in the case of radiography utilized for a diagnosis, targets to be radiographed include various regions covering from a head to limbs, and the regions to be targeted by medical doctors differ each other for each case. Therefore, the image processing condition for obtaining an image that is optimum for a diagnosis varies depending on a radiographed region. The image processing condition also varies depending on the radiographing direction, in the same way.

In the conventional apparatus in the past, therefore, it is necessary to input a radiographed region on a subject and the orientation.

Some hospitals are equipped with a hospital information system (HIS) or a radiology section information system (RIS), and they can acquire direct radiographed region information from the order information for radiography, and therefore, there is no need for operations of a radiologist, in particular, and optimum processing conditions can be selected. However, in the greater part of hospitals which are not equipped with these systems, radiologists and others need to input information manually.

In the case of urgent radiographing, radiologists or the like sometimes input information of the region of a subject manually, even in the hospitals equipped with the aforesaid HIS or RIS, for quick radiographing.

However, parts of the body radiographed generally include 100 or more types of regions, and it is complicated and troublesome to conduct inputting work for each radiographing, which has been a burden for a radiologist who conducts radiographing.

Therefore, it is demanded to recognize a region and orientation of a subject automatically by reading an image obtained through radiographing, and to select the optimum processing condition, for lightening the burden for the radiologist.

As a method to recognize a part of the body and orientation of a subject, there are methods described in TOKKAI Nos. 2001-76141 and 2001224576. In these methods, a region (subject region) where a subject is radiographed is recognized from the image, then, various feature value are extracted from the region, and a radiographed region and the orientation of the subject are recognized based on the feature value.

To recognize accurately the part of the body radiographed in the method of this sort, it is important to obtain accurately the feature value showing the part of the body of the subject from the image.

On the other hand, in the case of regions which are adjacent to each other, like a lumbar and a coccyx, it sometimes happens that both regions are radiographed on the same image. In this case, if the minute difference is not reflected as a different feature, the feature value obtained are mostly the same, and it is sometimes difficult to distinguish one from another.

Further, on an image of the lumbar, contrast of a subject is relatively low. In the case of the image of this sort, when trying to extract a feature value by investigating signal changes between neighboring pixels, and thereby, by investigating distribution of edge pixels having strong intensity of signal change, it is not possible to obtain the distribution of edge pixels depending on the structure of the subject, and it is sometimes impossible to obtain an effective feature value.

In addition, when trying to investigate presence of a lung field region and thereby to utilize the results of the investigation as feature value, even in the case of an image wherein a lung field is radiographed, a signal difference between the lung field region and the other region is made to be small by the presence of a change to a morbid state in the lung field, thus, recognition of the lung field region is sometimes difficult.

In these cases, if an arrangement is made so that feature value can be extracted based on a minute difference and signal change from the beginning, there is a high possibility that a change of an outline of a local subject region and a slight signal change between neighboring pixels are caught, and feature value which are different from those to be obtained originally are extracted accidentally. When the wrong feature value are extracted, there is a high possibility that the result of recognition of the region to be radiographed of a subject is also wrong.

Therefore, there is a demand for a feature extracting method wherein even a minute difference can be evaluated correctly, and wrong feature value are not extracted.

SUMMARY OF THE INVENTION

The invention has been achieved in view of the problems mentioned above, and its object is to realize a feature extracting method, a subject recognizing method and an image processing apparatus in all of which a minute difference can be reflected to recognize correctly the various radiographed regions in a wide scope covering from a head to bones of limbs, and correct feature value can be extracted without extracting wrong feature value, for radiation images.

Namely, with respect to the invention solving the aforementioned problems, in a method to recognize a radiographed region and a radiographing direction by a combination of some feature value such as a form of a subject region, distribution of edge pixels caused by a signal change between neighboring pixels, presence of a lung field to be detected based on a density change, it is possible to obtain correct feature value for various radiographed regions in a wide scope from a head to bones of limbs, by obtaining decisive feature value after investigating a minute change, when decisive feature value are not obtained in a single extracting of feature value, thus, radiographed regions and a radiographing direction for the object can be recognized accurately.

To be concrete, the details are described in the following Items (1)–(6). Incidentally, in the present specification, an outline of a subject region means a form of a silhouette of the human body portion in the radiation image.

Item (1)

The invention described in Item (1) is represented by a feature extracting method wherein a plurality of feature extracting steps each detecting an amount of radiation transmitted through a subject, and extracting feature value from a radiation image made by signal values corresponding to an amount of the detection, and a feature evaluating step evaluating feature value extracted by each of the aforementioned plural feature extracting steps are provided, and a condition for extracting the feature value is changed based on the results of the evaluation made by the feature evaluating step to conduct extraction of the feature value again.

The invention described in Item (7) is represented by an image processing apparatus wherein a plurality of feature extracting means each detecting an amount of radiation transmitted through a subject, and extracting feature value from a radiation image made by signal values corresponding to an amount of the detection, and a feature evaluating means evaluating feature value extracted by each of the aforementioned plural feature extracting means are provided, and the feature evaluating means changes a condition for extracting the feature value concerning a partial or total feature extracting means in the aforesaid feature extracting means, based on the results of the evaluation, to order extraction of the feature value again.

In these inventions, it is possible to extract the feature value which are effective and decisive for recognizing radiographed regions, because a condition for extracting the feature value is changed to conduct extracting of feature value again, concerning a partial or total feature extracting in the feature extracting, based on the results of the evaluation made in the course of feature extracting.

Namely, feature value are extracted once, and based on the results of evaluation of the extracted feature value, feature extracting is conducted again, and thereby, it is possible to extract feature value having less errors, while reflecting correctly a minute difference between similar radiographed regions.

Item (2)

The invention described in Item (2) is represented by the feature extracting method described in Item (1), wherein there is provided a subject region extracting step in which an amount of radiation transmitted through a subject is detected, and a subject region where a subject is radiographed is extracted, for a radiation image formed by signal values corresponding to the amount of the detection, and one or plural feature value are extracted from the subject region extracted by the subject region extracting step.

The invention described in Item (8) is represented by the image processing apparatus according to Item (7), wherein the feature extracting means has a subject region extracting means that extracts a subject region where a subject is radiographed in the radiation image, and one of plural feature value are extracted from the subject region extracted by the subject region extracting means.

In these inventions, it is possible to extract effective and decisive feature value, because a subject region is extracted in the course of feature extracting, and one or plural feature value are extracted from the extracted subject region.

Namely, it is possible to extract feature value which reflect effectively special characteristics of radiographed regions, by extracting, from the image, a subject region where the subject is radiographed, and by extracting feature value from the subject region.

Item (3)

The invention described in Item (3) is represented by the feature extracting method described in Item (2), wherein each of the plural feature extracting steps has an outline recognizing step that extracts feature value based on the outline of the subject region obtained by investigating an outline of the subject region.

The invention described in Item (9) is represented by the image processing apparatus according to Item (8), wherein each of the plural feature extracting means has an outline recognizing means that extracts feature value based on the outline of the subject region that is obtained by investigating an outline of the subject region.

In these inventions, it is possible to extract effective and decisive feature value, because feature value are extracted based on the outline of the subject region that is obtained by investigating an outline of the subject region.

Namely, it is possible to obtain information that is useful for recognizing the radiographed region or the radiographing direction for the subject, by extracting the feature based on the outline of the subject, as one of the feature value.

Item (4)

The invention described in Item (4) is represented by the feature extracting method described in either one of Items (1) and (2), wherein each of the plural feature extracting steps has an edge pattern recognizing step that investigates a signal change between neighboring pixels on optional pixels on the image, and further extracts feature value based on distribution of edge pixels having great intensity of signal change.

The invention described in Item (10) is represented by the image processing apparatus according to either one of Items (7) and (8), wherein each of the plural feature extracting means has an edge pattern recognizing means that investigates a signal change between neighboring pixels on optional pixels on the image, and further extracts feature value based on distribution of edge pixels having great intensity of signal change.

In these inventions, it is possible to extract effective and decisive feature value, because a signal change between neighboring pixels on optional pixels on the image is investigated, and further, feature value based on distribution of edge pixels having great intensity of signal change are extracted.

Namely, it is possible to obtain information that is useful for recognizing the radiographed region or the radiographing direction for the subject, by investigating a signal change between neighboring pixels in optional pixels on the image, as one of the feature value, and by extracting feature value based on distribution of edge pixels having great intensity of signal change.

Item (5)

The invention described in Item (5) is represented by the feature extracting method described in either one of Items (1) and (2), wherein each of the plural feature extracting steps has a lung field region detecting step that investigates presence of a lung field region and extracts the results of the investigation as the feature value.

The invention described in Item (11) is represented by the image processing apparatus according to either one of Items (7) and (8), wherein each of the plural feature extracting means has a lung field region detecting means that investigates presence of a lung field region and extracts the results of the investigation as the feature value.

In these inventions, it is possible to extract effective and decisive feature value for a lung field region, because presence of a lung field region is investigated, and the results of the investigation is further extracted as the feature value.

Namely, it is possible to obtain information that is useful for recognizing the radiographed region or the radiographing direction for the subject, by investigating presence of a lung field region and by extracting the results of the investigation as the feature value.

Item (6)

The invention described in Item (6) is represented by a subject recognizing method wherein feature value obtained by the feature extracting step in the Items 1–5 are used to recognize radiographed regions or radiographing directions for a subject in the radiation image.

The invention described in Item (12) is represented by an image processing apparatus wherein there is provided a subject recognizing means in which the feature value obtained by feature extracting means in the Items 7–11 are used to recognize radiographed regions or radiographing directions for a subject in the radiation image.

In these inventions, it is possible to recognize a subject by using effective and decisive feature value, because the feature value obtained through feature extracting in the aforesaid Items (1)–(5) are used to recognize radiographed regions or radiographing directions for a subject in the radiation image.

Namely, it is possible to obtain correct recognition results by recognizing the radiographed region or the radiographing direction for the subject based on the feature value extracted again by evaluating feature value obtained once.

BRIEF DESCRIPTION OF THE DRAWINGS

FIGS. 12(*a*) to 12(*d*) each is a diagram of a filter form for detecting an edge pixel in the present embodiment.

DETAILED DESCRIPTION OF THE PREFERRED EMBODIMENT

Figure 1:
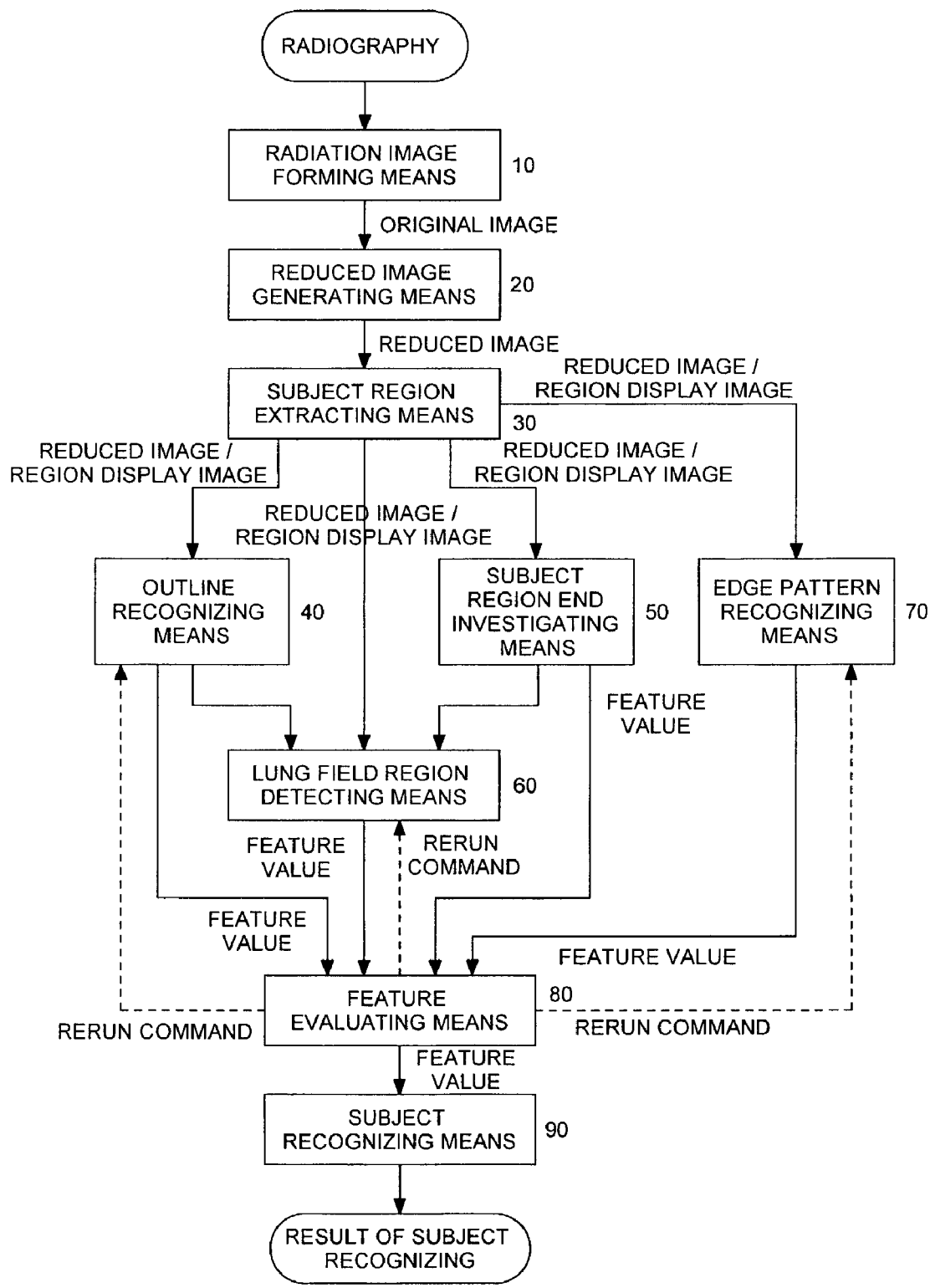
FIG. 1 is a functional block diagram showing the structure of an image processing apparatus in an embodiment of the invention.

An embodiment of the invention will be explained in detail as follows, referring to the drawings.

A feature extracting apparatus in the invention and a radiographed region of a subject based on the feature value obtained by the feature extracting apparatus, or the structure of an apparatus to recognize the radiographing direction will be explained in accordance with a rough block. Incidentally, each means in the present embodiment can be constituted with a hardware, a firmware or with a software. Therefore, a functional block diagram following processing procedures of each means is shown. Incidentally, this functional block diagram can be used also as a flow chart for understanding embodiments of a feature extracting method and a subject recognizing method.

For convenience' sake, when expressing coordinates of pixels, an upper corner on the left is made to be the origin, and the horizontal coordinate value takes a positive greater value as the coordinate position moves toward the right side, while, the vertical coordinate value takes a positive greater value as the coordinate position moves downward.

The structure of the present embodiment and operations thereof will be classified into (1)–(9) to be explained in detail as follow.

(1) Total Structure and Flow of Signals:

A radiation image obtained by radiation image forming means 10 is transmitted to reduced image generating means 20.

A pruned image (reduced image) generated by the reduced image generating means 20 is transmitted to outline recognizing means 40 representing a feature extracting means, subject region edge investigating means 50, lung field region detecting means 60 and edge pattern recognizing means 70, in addition to subject region extracting means 30.

In the subject region extracting means 30, an area (subject region) where the subject is actually radiographed in the image is extracted, and an region indicating image that shows the aforesaid region is transmitted to the outline recognizing means 40, the subject region edge investigating means 50, the lung field region detecting means 60 and the edge pattern recognizing means 70.

In the outline recognizing means 40, feature value showing an outline of the subject are extracted by the use of pruned images and region indicating images.

In the subject region edge investigating means 50, feature value showing how the subject region is in contact with an edge of the irradiation field or with the edge of the image are extracted by the use of pruned images and region indicating images.

Feature value obtained by the outline recognizing means 40 and the subject region edge investigating means 50 are transmitted respectively to the lung field region detecting means 60 and feature evaluating means 80.

In the lung field region detecting means 60, presence of the lung field region is investigated in the subject region based on combination of pruned images, region indicating images and transmitted feature value, and when the lung field region is discovered, the lung field region is detected. Then, the feature value based on the results of the detection of the lung field region are extracted to be transmitted to the feature evaluating means 80.

In the edge pattern recognizing means 70, a signal change between neighboring pixels is investigated for the optional pixel included in a subject region by the use of pruned images and region indicating images, and feature value relating mainly to a bone shape are extracted based on distribution of edge pixels having a big change of signals. Then, the feature value are transmitted to the feature evaluating means 80.

In the feature evaluating means 80, each feature value is evaluated to form a judgment whether additional extraction of feature value is necessary or not. When the additional extraction of feature value is judged to be necessary, a means to conduct extraction of feature value again is designated, and a condition used in the course of feature extraction is designated, to extract feature value. The feature value are evaluated again in case of need, and extraction of feature value is repeated.

When the feature value thus obtained satisfy the prescribed condition, each feature value is transmitted to subject recognizing means 90.

In the subject recognizing means 90, the region and the radiographing direction for the subject are recognized base on the feature value transmitted.

(2) Radiation Image Forming:

An image having a signal value that is proportional to a logarithm of an amount of irradiated radiation is obtained by radiation image forming means 10, and it is transmitted to the reduced image generating means 20. As this radiation image forming means, it is possible to use one employing the FPD and a known apparatus generating a radiation image by reading a stimulable phosphor plate. Incidentally, in the present embodiment, let it be assumed that a signal value being in proportion to a logarithm of an amount of radiation irradiated is obtained, and the more an amount of irradiation is, the higher the signal value is.

For reducing the time required for succeeding processing, pruned images wherein the number of pixels is reduced after sampling form the original image are made by the reduced image generating means 20, and this pruned image is transferred to the subject region extracting means 30.

Succeeding processing is conducted by the use of the pruned image. With respect to the pruned image, it is preferable that its pixel size is 1 mm square to about 5 mm square because it needs to be provided with an amount of information by which the feature value of the subject can be estimated, although it is preferable that the number of pixels is less to the utmost, because calculation time can be shortened. Incidentally, when there is room for hardware ability, an original image can also be used for processing, in place of using pruned images. In that case, the original image is transferred directly to the subject region extracting means 30 from the radiation image generating means. In the present embodiment, the following embodiment will be explained as one that conducts processing by the use of pruned images.

(3) Subject region Extracting:

The subject region extracting means 30 extracts the subject region as explained below (see FIG. 2).

On the image, there exist a directly irradiated area which is an region corresponding to no subject, and is irradiated directly by radiation and has an extremely high signal value, and an outside region of the irradiation field having a relatively low signal value generated by a lead plate shielding against radiation for avoiding unnecessary exposure to a human body. These regions hardly have useful information for recognizing radiographed regions for the subject. Therefore, these regions are eliminated by the subject region extracting means, and a subject region only is extracted, thus, useful information for recognizing radiographed regions for the subject can be provided. Incidentally, extraction of the subject region can be realized in the following procedures.

(3-a) An image is divided into a plurality of small regions (FIG. 2(*a*)).

(3-b) An average signal value of pixel signal values included in each small region is obtained as a threshold value Th1.

(3-c) Pixels each having a signal value that is lower than threshold value Thb1 are detected as a subject region for each small region (FIG. 2(*b*)).

(3-d) An average signal value of a subject region obtained in each small region is obtained, and this average signal value is made to be threshold value Thb2.

Figure 2A:
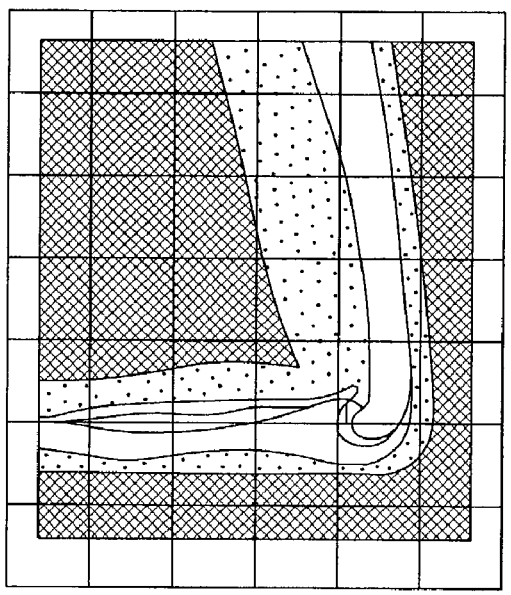
FIGS. 2(*a*) to 2(*d*) each is an illustration showing how a subject region is extracted in an embodiment of the invention.
Figure 2B:
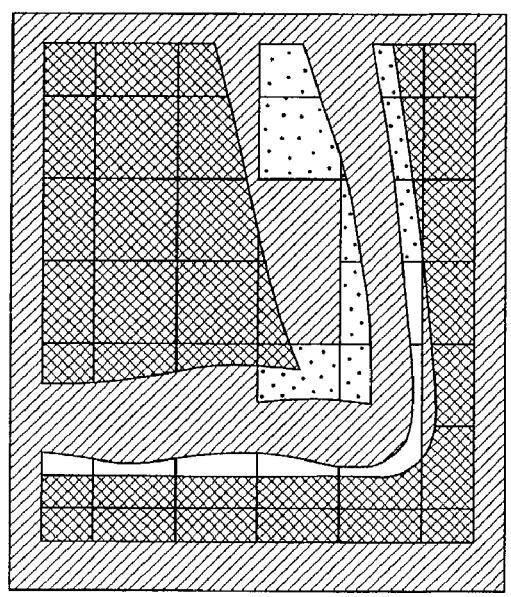
Figure 2C:
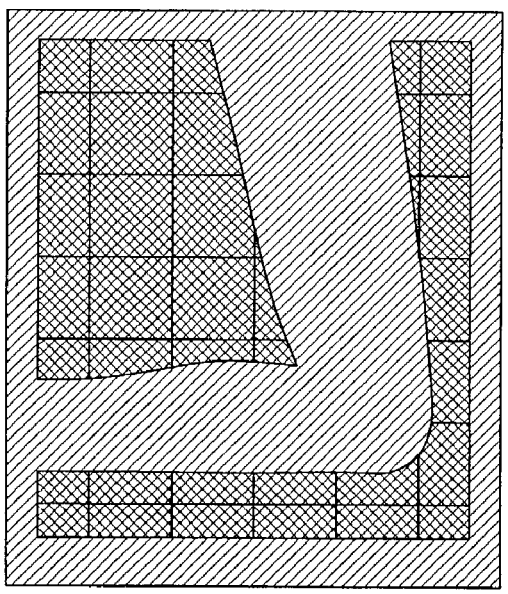

(3-e) Pixels each having a signal value that is lower than threshold value Thb2 are detected as a subject region for total images (FIG. 2(c)).

Figure 2D:
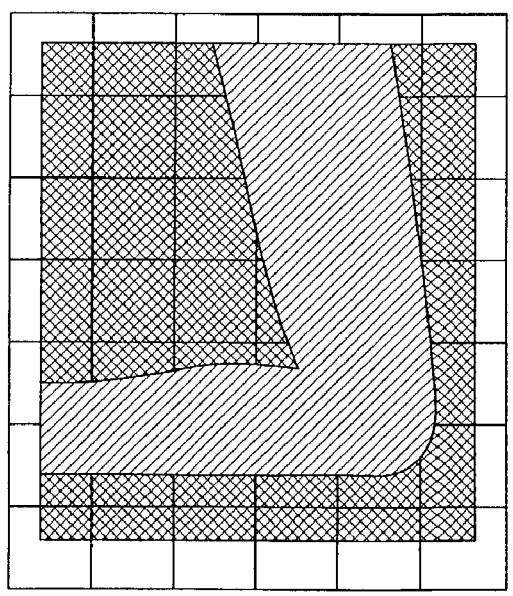

(3-f) For eliminating the outside region of the irradiation field from the detected subject region, a border line of the outside region of the irradiation field is obtained, and a space between the border line and an edge of the closer image is eliminated as an outside region of the irradiation field (FIG. 2(d)).

(3-g) The border line of the outside region of the irradiation field is obtained in the following procedures. First, a pixel positioned on the border of the subject region is detected as a border point. Then, a straight line on which many border points in the same direction are arranged is detected as a proposed border line. The proposed border line is detected if the number of border points existing on the straight line that is obtained by calculating an equation of a straight line from optional two border points is not less than the prescribed threshold value Thb3. When a space between the proposed border line and an edge of the image is mostly the subject region, the subject region up to the edge of the image is eliminated as an outside region of the irradiation field, with the proposed border line serving as a border line for the outside region of the irradiation field.

The subject region from which the outside region of the irradiation field has been eliminated is extracted anew as a subject region.

As another means for extracting a subject region, a method shown in the following (3-h) or (3-i) is considered.

(3-h) In the methods described in TOKKAISHO Nos. 63-259538 AND 63-244029 and TOKKAIHEI No. 5-7579, a signal value corresponding to the area irradiated directly by radiation is found out from a form of a histogram of a pixel signal value within an irradiation field region, after detecting the irradiation field area, and the irradiation field area representing the irradiation field from which the area corresponding to the aforementioned signal values found has been eliminated is made to be the subject region. The signal value corresponding to the area irradiated directly by radiation can be detected when threshold values for a high signal area showing the direct irradiation area in the histogram stated above and for an area where the signal is lower than the high signal due to transmission through the subject are obtained by a means such as, for example, discriminant analysis, and an area where the signal is higher than the threshold value is regarded as the direct irradiation area.

(3-i) Further, for avoiding an influence of unevenness caused by a heel effect or by a radiation image forming means, detection of threshold values for eliminating the aforesaid direct irradiation area can be carried out in a method to conduct with a means such as the discriminant analysis as in the foregoing, by preparing a pixel signal value histogram for each area that is divided into a plurality of blocks, such as division into four parts by dividing an image vertically and horizontally respectively into two parts.

The subject region information showing the subject region obtained by the aforesaid means is given as an area indicating image in a size that is the same as that of the pruned image (original image when an image obtained from radiation image forming means 10 is used directly) obtained from reduced image forming means 20, and pixels are set so that a pixel outside the subject region may take a pixel value of '0', a pixel included in the subject region may take a pixel value of '1' and a pixel positioned on the border line of the outside region of the irradiation field (edge of the irradiation field) may take a pixel value of '2'.

When the subject region is composed of a plurality of areas which are not connected each other, the maximum area only is extracted. For calculation of the number of subject regions and for classification of each area, it is possible to use, for example, labeling processing which has been used commonly.

When the subject region is classified into a plurality of areas, the number of pixels included in each area is counted respectively, and only area where the number of pixels is maximum is made to be a subject region anew to update the subject region information. The area indicating image that indicates the subject region information thus obtained is transmitted to outline recognizing means 40, subject region edge investigating means 50, lung field region detecting means 60 and edge pattern recognizing means 70.

(4) Outline Recognition:

The outline recognizing means 40 recognizes an outline of the subject from the area indicating image by classifying into some patterns, based on a form of a contour of the subject region and on the change of a width of the subject region depending on its position.

The outline recognizing means 40 is composed of area border point detecting means 41, position change amount calculating means 42, area width calculating means 43 and form specifying means 44, which are not illustrated in FIG. 1.

Figure 3:
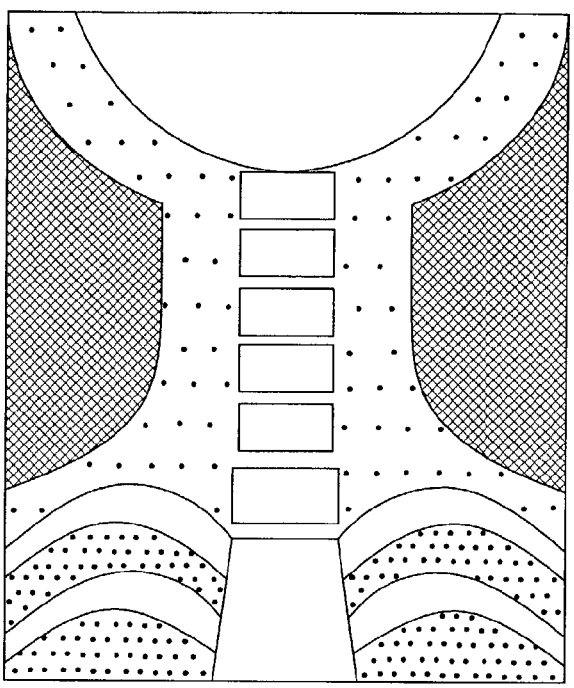
FIGS. 3(*a*) and 3(*b*) each is an illustration showing how an outline is recognized in an embodiment of the invention.
Figure 3:
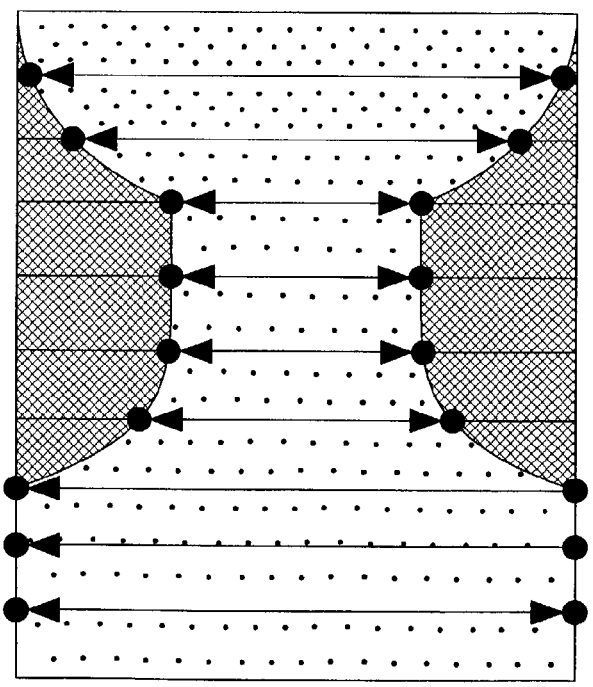

(4-1) Area Border Point Detection:

The area border point detecting means 41 (not shown) detects area border points as shown in FIG. 3, in accordance with procedures of the following (4-1a) and (4-1b).

(4-1a) There are established a plurality of different scanning lines which scan from one end to the other end of the image successively in the horizontal direction at regular intervals, for the area indicating image that shows subject region information.

(4-1b) Pixel values are investigated on each scanning line, while moving by one pixel successively from the left end of the image to the right side, and a pixel on the position where a pixel value changes from '0' to '1' or from '2' to '1' is detected as an area border point (left). After that, image pixels are investigated on the same scanning line, while moving by one pixel successively from the right end of the image to the left side, and a pixel on the position where a pixel value changes from '0' to '1' or from '2' to '1' is also detected as an area border point (right). If a pixel value on the image end is '1', a pixel on the image end on that scanning line is made to be an area border point. With respect to each area border point thus detected, its coordinate value and information showing the side (left or right) to which the area border point belongs are transmitted to the position change amount calculating means 42 and area width calculating means 43 (not shown).

(4-2) Position Change Amount Calculation:

The position change amount calculating means 42 (not shown) calculates a position change amount in the following way. First, a difference of a horizontal coordinate value from an adjoining area border point is calculated for each group of left or right, concerning the area border point obtained by the area border point detecting means 41.

Next, a maximum point (a point where the horizontal coordinate is on the leftmost side locally for the (left) group, and a point where the horizontal coordinate is on the rightmost side locally for the (right) group) where a subject region form is 'convex' and a minimum point (a point where the horizontal coordinate is on the rightmost side locally for the (left) group, and a point where the horizontal coordinate is on the leftmost side locally for the (right) group) where a subject region form is 'concave', both in terms of horizontal coordinates for each group, are obtained from the difference of the horizontal coordinate values. Further, a degree of irregularity in the vicinity of each of these poles (maximum point and minimum point) is investigated.

In this case, a position of the pole and a degree of irregularity are calculated in the following way.

The method explained below can be used for both a (left) group and a (right) group equally, and therefore, the method for the group on one side only will be explained.

(4-2) Pole Position Detection:

Following processing operations are conducted in succession from the upper portion of the subject region with respect to the area border points other than the area border points existing on the uppermost portion and the lowermost portion of the subject region.

Difference value s1 of the horizontal coordinates between the area border point p0 and adjoining area border point p1 existing above the area border point p0 is obtained. In the same way, difference value s2 of the horizontal coordinates between the area border point p0 and adjoining area border point p2 existing under the area border point p0 is obtained. Regarding a method of calculating a difference value, the difference value is obtained by subtracting the horizontal coordinate of the area border point existing on the upper portion from that of the area border point existing on the lower portion.

Next, a sign of s1×s2 is investigated, and when the prescribed condition is satisfied, poles are detected.
The area border point p0 is made to be a pole for s1×s2<0.
When s1×s2=0 holds and one of sj (j=1, 2) only is zero, difference values of horizontal coordinates are calculated in succession in the direction to leave p0 with respect to p0 and other area border points existing near p0, for the direction (upward or downward) where the difference value is zero. Then, when the difference value takes the numerical value other than zero first, the difference value is made to be sj anew. Then, s1×s2 is calculated again. If s1×s2<0 holds in this case, the middle point of the area border point where p0 and sj take numerical values other than zero first, is made to be the pole.

(4-2i) Degree of Irregularity (Concave/Convex):

First, difference values of horizontal coordinates between adjoining area border points are investigated upward in succession from the pole, and point a where the difference value has a sign opposite to that of a difference value in the vicinity of the upper portion of the pole, or the difference value becomes zero, is obtained. In the same way, difference values of horizontal coordinates between adjoining area border points are investigated downward in succession from the pole, and point b where the difference value has a sign opposite to that of a difference value in the vicinity of the lower portion of the pole, or the difference value becomes zero, is obtained.

When a point where the difference value has a sign opposite to that of a difference value in the vicinity of the pole is not found for the point a and the point b, an uppermost point and a lowermost point of the vertical coordinates where the subject exists are made respectively to be point a and point b. A difference between an average value of horizontal coordinates of the points a and b and a horizontal coordinate of the pole is made to be the depth, and a difference of vertical coordinates between point a and point b is made to be the width, both representing an index that indicates a degree of irregularity.

As a method to obtain the points a and b, a secondary differential value may also be used as a standard, in place of using a difference value as a standard. Even in the case of using the secondary differential value as a standard, a point where the secondary differential value takes a sign opposite to that of the secondary differential value in the vicinity of the pole or the secondary differential value becomes '0' is made to be point a and point b.

When investigating a degree of the irregularity, it is preferable to devise, such as, to increase, to a certain extent, a distance between area border points for calculating the difference value to prevent that macroscopic changes are overlooked by detection of minute changes. For example, there are methods to use only area border points existing on the divided line that is formed by dividing a length of a subject region in the vertical direction (direction perpendicular to the scanning line in the case of detecting the area border points) into 10–30 equal parts, or to obtain an average horizontal coordinate of plural adjoining area border points and thereby to obtain the difference value with a standard of the average horizontal coordinate.

Figure 4:
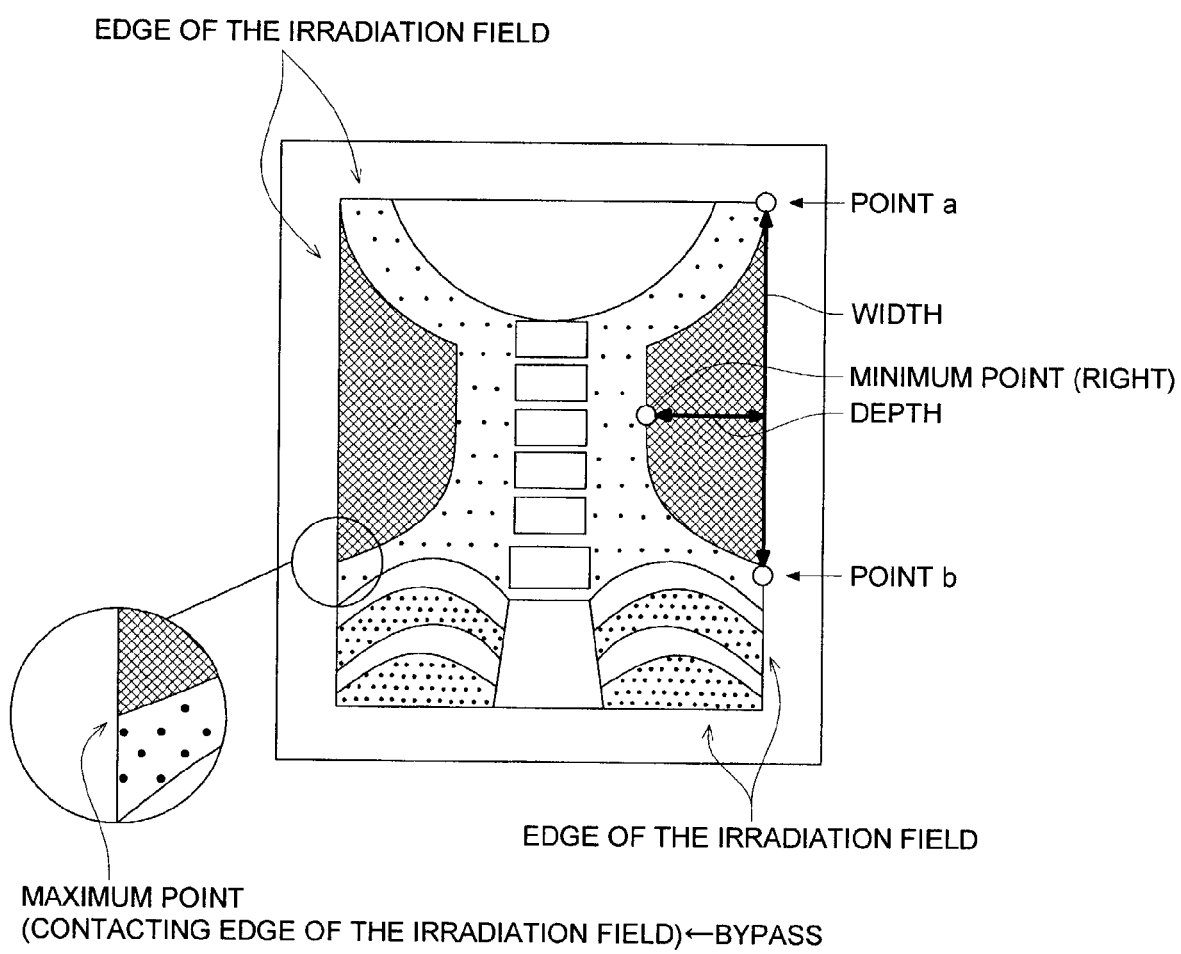
FIG. 4 is an illustration about investigation of irregularity of a contour of a subject region in the present embodiment.
Figure 5A:
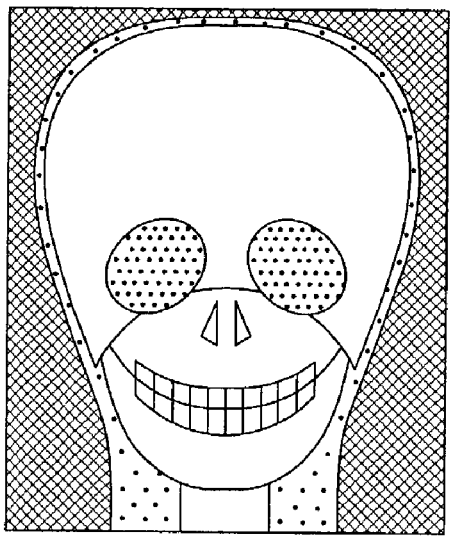
FIGS. 5(*a*-1) to 5(*b*-2) each is an illustration showing how a form is specified in an embodiment of the invention.
Figure 5A:
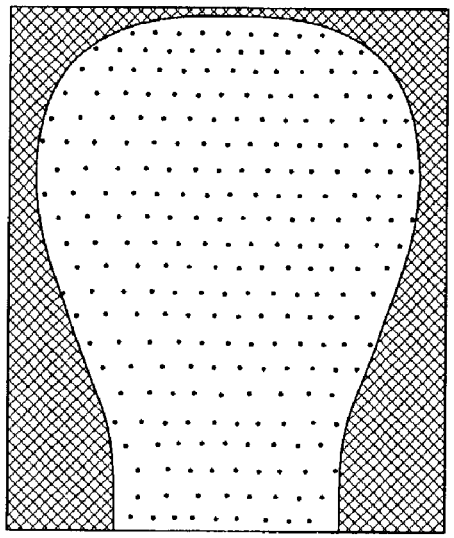
Figure 5B:
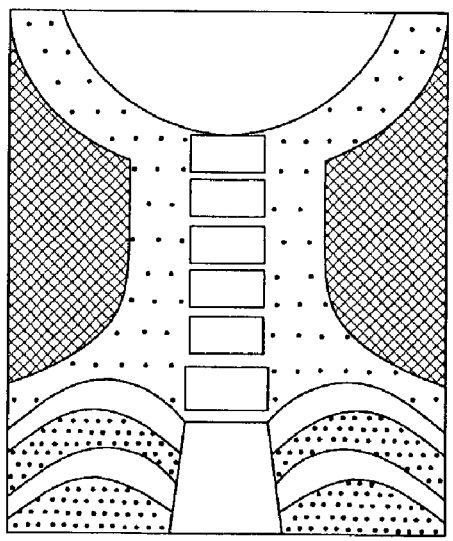
Figure 5B:
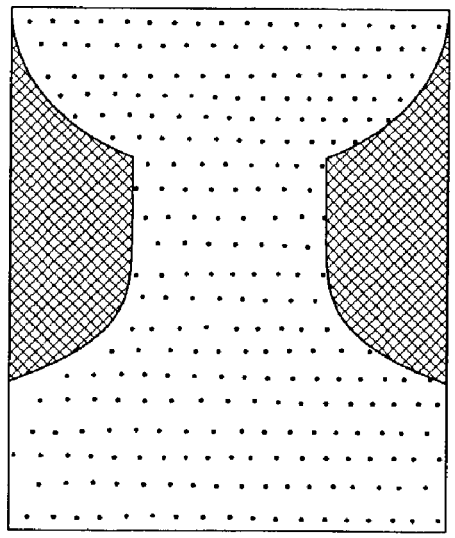
Figure 6A:
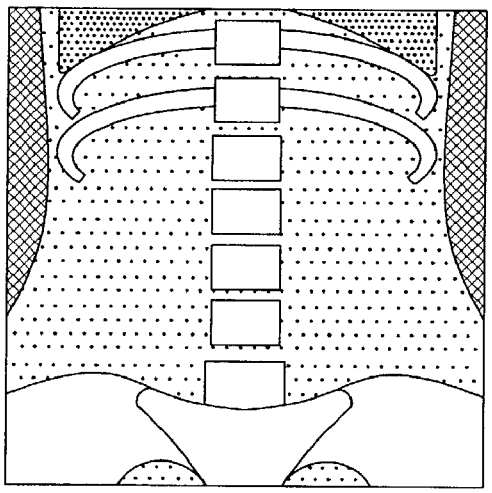
FIGS. 6(*a*-1) to 6(*b*-2) each is an illustration showing how a form is specified in an embodiment of the invention.
Figure 6A:
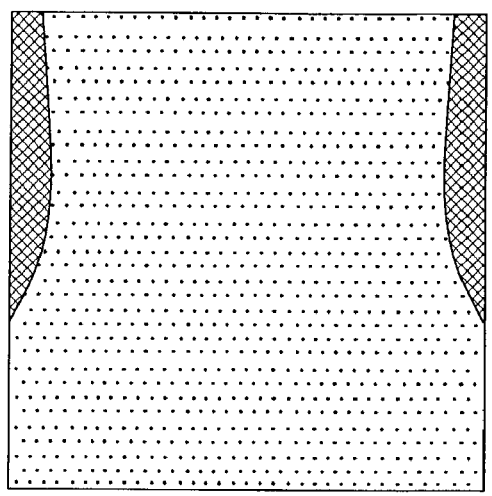
Figure 6B:
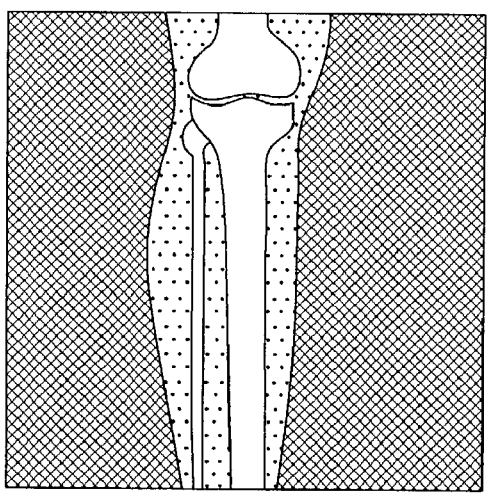
Figure 6B:
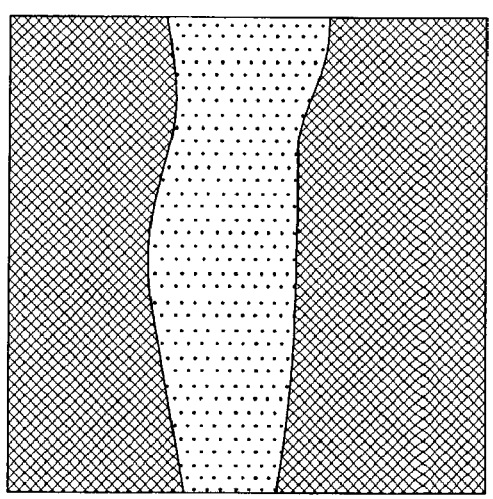

Further, in the place where the subject region is in contact with the edge of the irradiation field, it sometimes happens that a subject becomes different in terms of a shape from its original one to be of a convex form (see FIG. 4). Therefore, when a pole is the maximum point and a subject region comes in contact with an edge of the irradiation field, the pole is regarded not to be detected, and a depth and a width are made to be '0'.

Regarding the judgment whether the subject region comes in contact with the edge of the irradiation field or not, if there is a pixel wherein a pixel value of an area indicating image showing an edge of the irradiating field within the prescribed distance (1–3 pixels) is '2', in a plurality of area border points existing near the pole and at the upper portion or the lower portion, the subject region and the edge of the irradiation field are judged to be in contact each other.

Among some poles obtained in the aforementioned manners, the one having a high degree of irregularity is considered to represent the outline mostly. Therefore, there are extracted the prescribed number (the number of 1—about 3 is preferable) of poles only in the order wherein the pole having the greatest absolute value of the depth comes first, for the (left) group or the (right) group, and information including a position of the pole, concavity or convexity, a depth and a width is made to be the position change amount information as a set.

(4-3) Area Width Calculation:

In the area width calculating means 43 (not shown), a distance between border points existing on the same scanning line among the aforesaid area border points is obtained. The distance thus obtained is transmitted to form specifying means 44 together with coordinate values in the vertical direction of the scanning line, as area width information.

(4-4) Form Specifying:

In the form specifying means 44 (not shown), the outline is specified by classifying into plural patterns prepared in advance, from the position change amount information and the area width information.

Characteristics of the outline of a human body in radiography vary depending on a region representing the subject. For example, in an image of the head as shown in each of FIGS. 5(*a*-1) and 5(*a*-2), when the position change amount information obtained from each of the (left) group and the (right) group is investigated from the top to the bottom side of the image, positions of contours approach the left end and the right end of the image on the half way, and then, they change to leave the image ends again. Therefore, the outline can be classified as "a barrel type".

On the other hand, in the case of a neck image as shown in each of FIGS. 5(*b*-1) and 5(*b*-2), it is understood that positions of contours leave the image end once on the half way, on the contrary, and then, they change to approach the image ends again. In this case, the outline can be classified as "sandglass" type.

Further, with respect to an abdomen image as shown in each of FIGS. 6(*a*-1) and 6(*a*-2), and to a lower limb image as shown in each of FIGS. 6(*b*-1) and 6(*b*-2), position changes of the area border point in the horizontal direction are less, and outlines of both of them are mostly rectangular. However, when area width information is used, it is understood that a width of the abdomen image is broad and that of the lower limb image is narrow, thus, they can be classified respectively as a "square type" and a "rectangle type".

Figure 7:
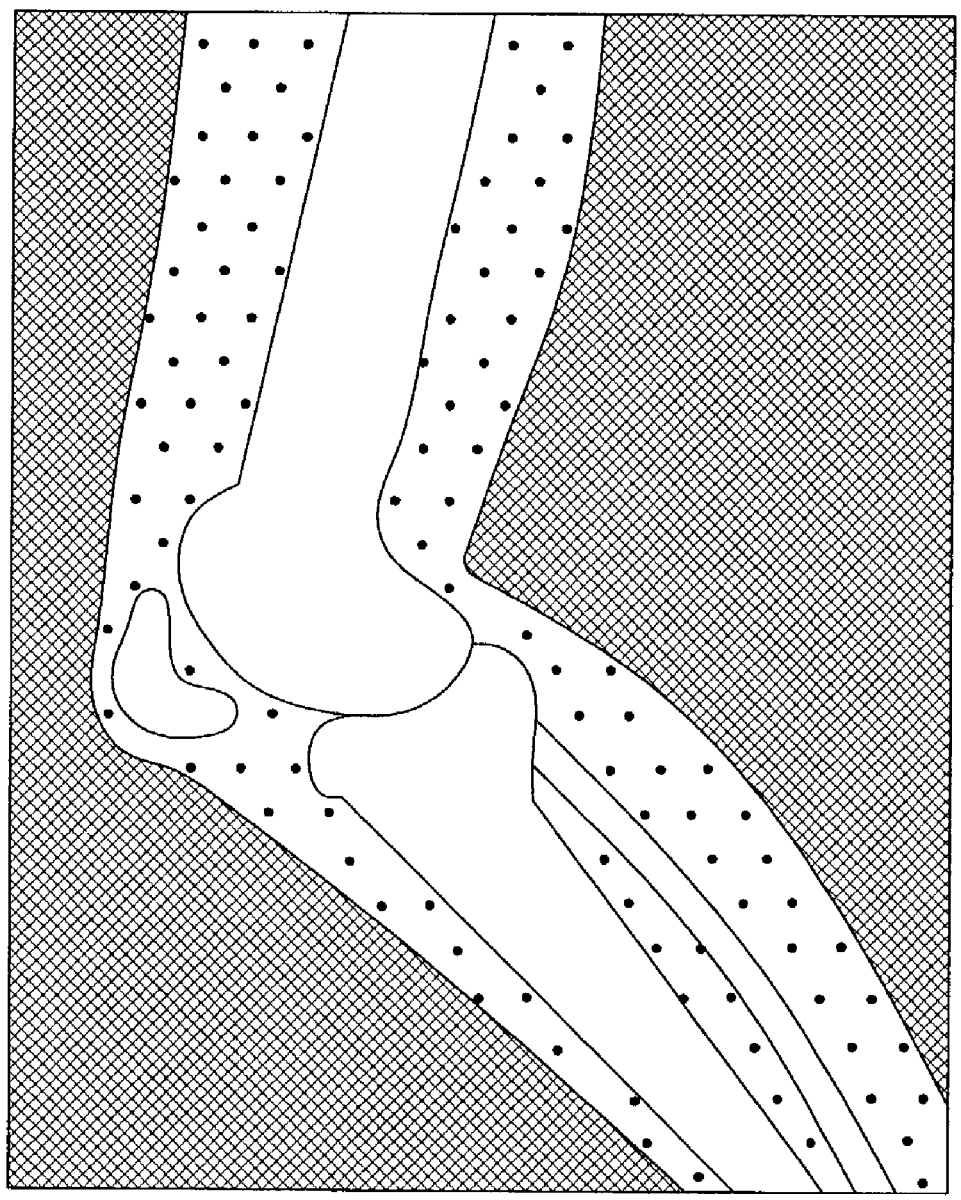
FIG. 7 is an illustration showing how a form is specified in an embodiment of the invention.

Furthermore, a knee joint image as shown in FIG. 7 can be classified as a "boomerang type" because the image is doglegged on the half way. In addition to that, there are considered a "fan type" (shoulder joint) wherein one corner of a rectangle is rounded, a "ramification type" (hand and fingers) wherein a subject region is branched into some portions on the half way, a "single side-convex type" (heel, coccyx) which is mostly semicircular, a "single side-concave type" (lumbar) and a "triangle type" (clavicle).

(4-4a) Detailed Explanation of Classification Examples:

By using the position change amount information and the area width information, an outline of the subject is classified to the form which is considered to be optimum among some patters in which the outline of the subject is shown.

(4-4a (1)) Barrel Type Classification Condition:

For example, the conditions for classifying to the "barrel type" are defined as follows.

The pole having the widest width is convex for both (left) and (right).

The position for each of the both poles is present at the center portion, when each subject is divided into three equal parts vertically.

The depth for each of the both poles is 20% or more of an average width in the direction from side to side of the subject, for both of them.

(4-4a (2)) Sandglass Type Classification Condition:

Equally, the conditions for classifying to the "sandglass type" are defined as follows.

The pole having the widest width is concave for both (left) and (right).

The position for each of the both poles is present at the center portion, when each subject is divided into three equal parts vertically.

The total of depths of both poles is 20% or more of an average width in the direction from side to side of the subject.

(4-4a (3)) Boomerang Type Classification Condition:

The conditions for classifying to the "boomerang type" are defined as follows.

The pole having the widest width is convex for one of (left) and (right), and is concave for the other.

The depth for each of the both poles is 10% or more of an average width in the direction from side to side of the subject, for both of them.

(4-4a (4)) Boomerang Type Classification Condition:

The conditions for classifying to the "square type" and the "rectangle type" are defined as follows.

The pole having the deepest depth is less than 10% of an average value in the direction of side to side for (left) and (right).

With respect to the ratio of a length in the direction from side to side of the subject to that in the vertical direction;

If the ratio is smaller than 2, that is, if the longer side is less than twice the shorter side, the image is a "square type".

If the ratio is not less than 2, that is, if the longer side is not less than twice the shorter side, the image is a "rectangle type".

Incidentally, the classification conditions shown above represent just an example, and other conditions are also considered. Further, it is also possible to establish plural judgment conditions for extracting one feature.

As stated above, the outline is classified into some patterns by the position change amount information and the area width information. The results of the classification are outputted as feature value to be obtained finally. For example, the results of the output are stored to be related to each element of the form vector S indicating the results of the classification. The form vector S is expressed in a way wherein only an element corresponding to the results of the classification has a value other than '0'. For example, element numbers corresponding to a "barrel type", a "sandglass type", a "boomerang type", a "square type" and a "rectangle" type are respectively set to '0', '1', '2', '3' and '4'. Then, if the result of the classification is the "barrel type", it is stored as S[0]=1, and if the result of the classification is the "sandglass type", it is stored as S[1]=1. This form vector S is outputted as feature value.

In some cases, it is sometimes difficult to classify to a certain type simply. Therefore, it is also possible to conduct weighting for feature value corresponding to patterns which can be proposed ones, and to output them respectively. In this case, a plurality of elements among the aforesaid form vector S are made to have values other than '0', and the total of the values of elements is set to be a certain value (for example, '5'). Then, values are assigned so that the element corresponding to the form with a higher degree of assurance may have the greater value.

In the judgment criteria for the "sandglass type", for example, when the condition for the depth is slightly insufficient (the total of the depths of poles is only 18% for the average width in the direction from side to side of the subject), it is delicate to classify whether to a "square (rectangle) type" or to a "sandglass type". In this case, values are assigned to both the element of the form vector S indicating the "sandglass type" and the element indicating the "square (rectangle) type".

As an example of assigning the values, in this case, when the total of depths is not more than 10%, element S [3(4)] representing a "square (rectangle) type" is made to be 5, and element S [1] representing a "sandglass type" is made to be 0, and the value of S [3(4)] is reduced by '1' and the value of S [1] is increased by '1' on the contrary, each time the aforesaid total of depths is increased by 2% of the average width in the direction from side to side of the subject.

In addition to the example between the "sandglass type" and the "square (rectangle) type", the same thing can be conducted between the "barrel type" and the "square (rectangle) type", between the "square type" and the "rectangle type", and between the "boomerang type" and the "square (rectangle) type".

In the present embodiment, the total value of elements of the form vector S is set to be '5'.

(4-5) Others:

Though the scanning is conducted in the horizontal direction only in the embodiment stated above, it is preferable, when specifying the form more accurately, that the scanning is conducted even in the vertical direction, and position change amount information and area width information are obtained after detecting an area border point in the same way, to use them for form specification.

The feature value (form vector S) thus obtained are transmitted to lung field region detecting means 60 and to feature evaluating means 80, as the outline information.

(5) Subject Region Edge Investigation:

Further, how the subject region and an image edge, or how the subject region and an edge of the irradiation field are in contact each other is also useful information for recognizing the subject. Therefore, subject region edge investigating means 50 conducts the subject region edge investigation.

For example, when the subject is one wherein the chest or the abdomen is radiographed as a subject, the top and bottom (or left and right) of at least an image edge or an edge of the irradiation field come into contact with the subject, in the radiographing apparatus which is usually used, because the human body is larger than a range where an image can be obtained. When the subject is one wherein fingers or toes are radiographed as a subject, on the other hand, the subject sometimes comes in contact with only one end in the vertical direction or horizontal direction among the image edge or the edge of the irradiation field, because the subject is small. In addition, in the case of radiography for a shoulder joint, the subject comes in contact only with edges in the two adjoining directions among the image edges and the edges of the irradiation field on the top and bottom and the left and right, without coming in contact with the rest of edges.

It is possible to obtain information for specifying the radiographed regions from a degree of contact between the subject region and an image edge and between the subject region and an edge of the irradiation field.

To obtain this information, therefore, subject region edge investigating means 50 counts the number of pixels wherein the subject is in contact with each side on the top and bottom as well as left and right for the image edge or the edge of the irradiation field, and obtains the total of the pixels which are in contact with each side. Judgment of the contact can be conducted in the same method as in the explanation for the occasion where the outline becomes convex because of contact with the edge of the irradiation field in the explanation of the position change amount calculating method 42. The total of the pixels obtained for each side is made to be information of area edge contact between the subject and the image edge or between the subject and the edge of the irradiation field, which are transmitted to lung field region detecting means 60 and feature value evaluating means 80.

(6) Lung Field Region Detection:

Detection of the lung field region is conducted by the lung field region detecting means 60, by detecting a contour line that implies a contour of the lung field, and by investigating signal values of the area surrounded by the contour line.

Incidentally, though the lung field region detecting means 60 is not shown in FIG. 1, it is supposed to be composed of lung field contour specifying means 61 (horizontal direction contour detecting means 611 and vertical direction border detecting means 612), proposed lung field region detecting means 62 and of lung field region true-false judging means 63.

Since the lung field transmits more radiations than its neighboring portions do in general, a portion corresponding to the lung field region on the image has higher signal values than its neighboring portions do. Further, on the chest, the lung field occupies a large area. Therefore, if signal values are investigated in the direction to cross the human body horizontally from the lung field to the subject region, on the image, the signal value shows its lowest level on the contour portion of the lung field. Then, if a position further moves toward an edge portion of the subject region from the lung field contour, an amount of radiations arriving at a detector is gradually increased because a width of the human body through which the radiation is transmitted is reduced gradually, thus, the signal value rises gradually on the image. In other words, the signal value shows a V-shaped reduction on the lung field contour portion.

Figure 8:
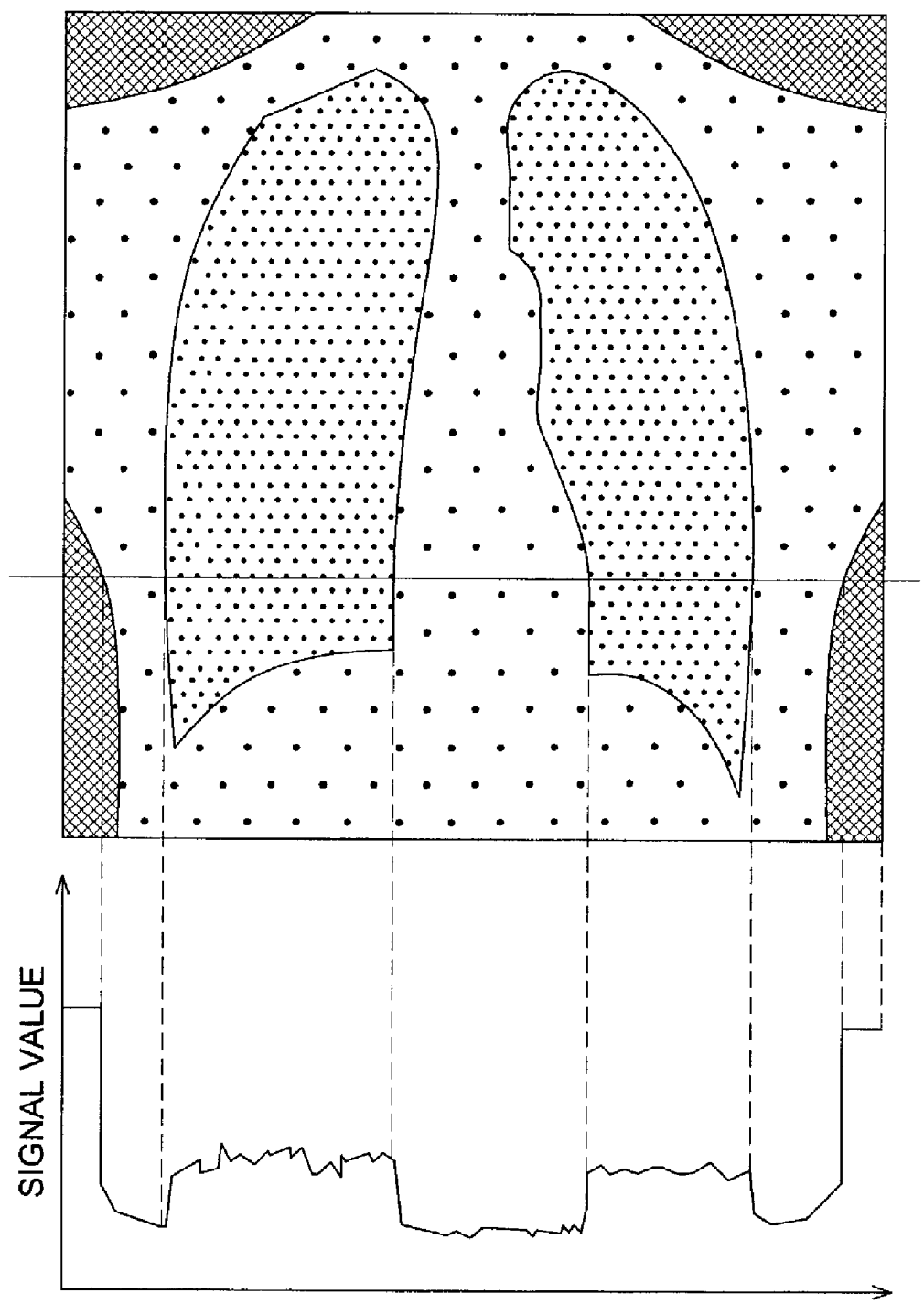
FIG. 8 is an illustration about signal changes for a contour in the horizontal direction of a lung field region in the present embodiment.

Therefore, recognition of a V-shaped portion corresponding to the lung field contour is a strong key for detection of the lung field (see FIG. 8).

Figure 9:
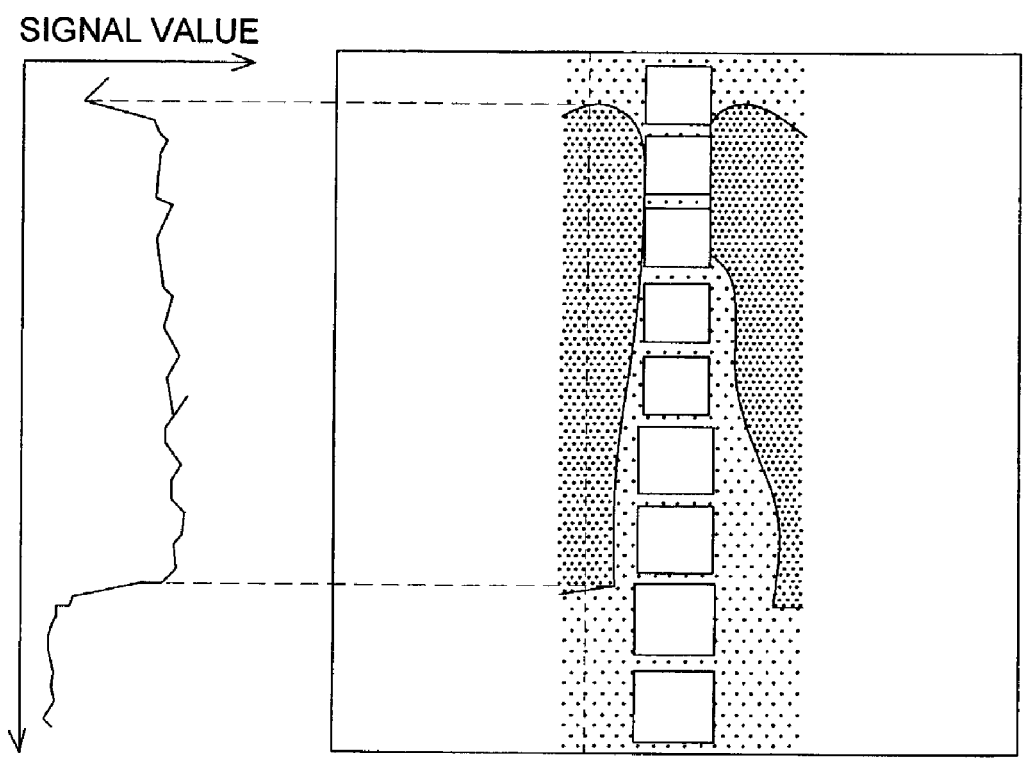
FIG. 9 is an illustration about signal changes for a border in the vertical direction of a lung field region in the present embodiment.

On the other hand, in the radiography, an irradiation field is stopped down to be small for radiographing in many cases, to avoid unnecessary exposure to the human body. Therefore, even in the case of the lung field radiographed, it is sometimes impossible to recognize a contour of the lung field. For example, when a thoracic vertebrae is radiographed as a primary subject, the irradiation field is stopped down to be narrow along the thoracic vertebrae because what is necessary to be observed is only the thoracic vertebrae, and the lung field excluding a part thereof becomes an outside region of the irradiation field, which sometimes makes recognition of the contour of the lung field impossible (see FIG. 9).

Even in the case of this kind, if the signal change is investigated in the vertical direction along the thoracic vertebrae, it is understood that the signal value declines sharply on the portion lower than the lung field and the diaphragm, or on the boundary portion between the lung field and a heart, when the observation point comes out of the lung field. Accordingly, it sometimes happens that investigating in the vertical direction without investigating in the horizontal direction is more effective, depending on how the irradiation field is stopped down.

In addition, even in the case of the subject wherein the lung field is not radiographed at all, a V-shaped signal change is sometimes generated on the edge portion of a bone, which is sometimes difficult to be distinguished from the lung field. For example, even in the case of the image wherein a head is radiographed, it sometimes happens that a V-shaped signal change is detected accidentally along the contour portion of the skull. However, when the subject is a head, the outline of the subject region is a "barrel type", which is different from the occasion where the outline is mostly a "rectangular type" when the chest is radiographed.

For detecting correctly the lung field region as stated above, it is understood that it is preferable to change an investigation method for the lung field region in accordance with the outline of the subject region and the state of contact between the subject region and the edge of the irradiation field, or to stop the investigation itself for the lung field region.

Therefore, in the present embodiment, outline information of the subject region and area edge contact information are used to determine an appropriate method from a plurality of the lung field contour detecting methods and thereby to detect the lung field contour, and then, signal values of the area surrounded by the detected lung field contours are investigated to determine whether the area is the lung field region or not, thus, the lung field region is detected.

(6-1) Lung Field Contour Specifying:

A lung field contour specifying means (not shown) has therein a horizontal direction contour detecting means (not shown) that scans a subject region in the horizontal direction to detect a contour of the lung field and a vertical direction border detecting means (not shown) that discovers a border between a lung field and a diaphragm by detecting a big signal change after scanning the subject region in the vertical direction.

First, outline information obtained by outline recognizing means 40 and area edge contact information obtained by subject region edge investigating means 50 are used to determine whether the lung field region needs to be detected or not. When existence of the lung field is clearly denied by the outline information, the lung field region is not detected, and "no existence of the lung field region" itself is outputted as the feature value.

The occasion wherein the lung field region is not detected means an occasion wherein the chest is considered not to be radiographed, based on information of the outline and the state of the area edge contact. Examples thereof include occasions of a "barrel type" wherein a radiographed subject is presumed to be a head, a "ramification type" wherein a radiographed subject is presumed to be a finger bone, and a "boomerang type" wherein a radiographed subject is presumed to be an elbow joint or a knee joint, and an occasion wherein a radiographed subject is presumed to be a terminal portion of a human body such as a finger or a toe, and only one side among an upper, lower, left and right sides in the subject region is in contact with the edge of the irradiation field or with the image edge, under the area edge contact state.

Next, when detecting the lung field region, a contour of the lung field is detected by a horizontal direction contour detecting means first. Detection of the lung field contour is conducted in the following procedures.

The subject are is scanned in the horizontal direction by a plurality of different scanning lines.

Signal changes between neighboring pixels are investigated from the left end to the right end of the subject region in succession, on each scanning line.

The signal change is investigated by a comparison between value Sh obtained by calculation of the following expression (1) and a threshold value that is set in advance;

$$Sh = \sum_i \sum_j Px+i+k, y+j + \sum_i \sum_j Px+i-k,$$
$$y+j-2\cdot \sum_i \sum_j Px+i, y+j$$
(Numeral 1)

wherein, Px,y represent signal values of pixels representing respectively coordinate value x in the horizontal direction and coordinate value y in the vertical direction, and k is a natural number having a value with which a signal change between neighboring pixels can be investigated.

Further, a range for obtaining the total of pixel values varies depending on a size of the subject region and a pruned image (original image in some cases), and the number of pixels corresponding to about 1–10 mm square in an actual size is desirable. This range has a fineness at the level that does not damage feature value of the detailed portion of the subject region, and is a range that is rough enough to be hardly affected by a noise.

When the value of Sh obtained by the expression above comes to the threshold value or more, it is detected as a proposed point of the lung field contour.

It is preferable that this threshold value is a value of about 5–20% per one pixel in terms of a logarithm ratio of an amount of radiation rays arriving at a detector, and it is desirable to establish it so that the threshold value may become smaller when a subject is smaller. The reason for this is that the signal difference between the lung field and other areas is less when the subject is smaller.

The expression for Sh is not limited to the aforesaid expression, and any expressions are acceptable if they can catch a V-shaped signal change. For example, there is a method wherein a serious view is taken for a degree of contribution of a signal value on the side farther from the contour of the subject region, as in expression (2), because the lung field region exists to be closer to the center of the subject region in many cases.

$$Sh = 2\cdot \sum_i \sum_j Px+i+k, y+j + \sum_i \sum_j Px+i-k,$$
$$y+j-3\cdot \sum_i \sum_j Px+i, y+j$$
(Numeral 2)

In the same way, signal changes are investigated from the right end to the left end of the subject region in succession in this case, on each scanning line, and when the value of Sh becomes equal to or higher than the threshold value, it is detected as a proposed point of the lung field contour. In this case, the sign of k in the expression (2) above is reversed.

Now, it is desirable that the scanning range on each scanning line is changed based on outline information and area edge contact information.

For example, when the subject is judged to be a "square type" or a "rectangle type" based on the outline information, it is considered that the chest is mainly radiographed, if the lung field is radiographed. In this case, it is possible to prevent erroneous detection of the lung field contour and to improve accuracy of recognition, by limiting the scanning range to an area near the edge portion of the subject region, because the lung field is considered to exist up to the portion in the vicinity of the edge portion of the subject region in the horizontal direction of the subject.

Figure 11:
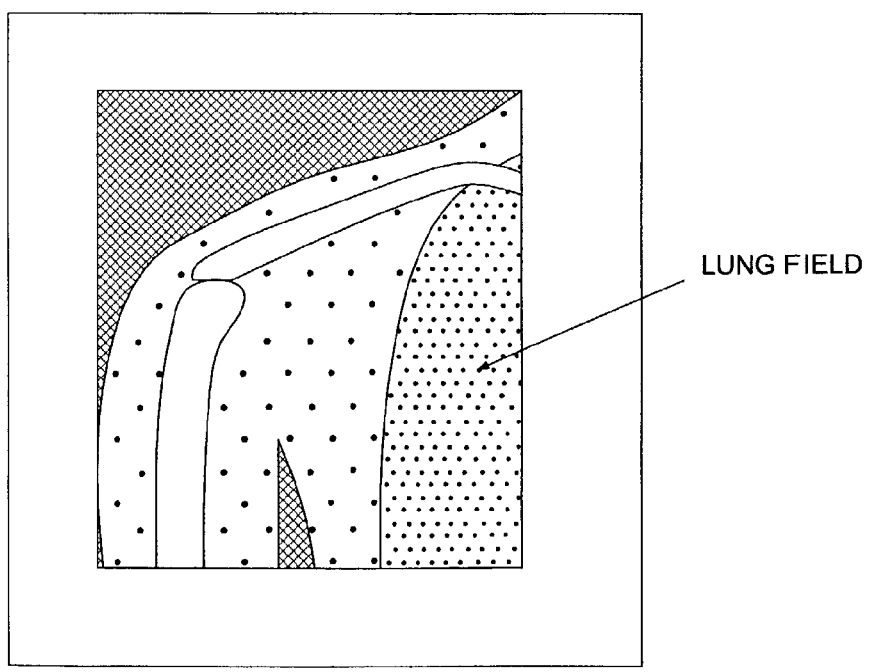
FIG. 11 is an illustration about detection of a lung field region in the present embodiment.

Further, when the outline is a "fan type" showing a shoulder joint, it is considered that the lung field exists to be closer to the edge on one side of the subject region (see FIG. 11). In this case, a portion near the center of the subject region is included for the range of scanning.

Next, positions of the proposed points of the detected lung field contour are investigated to study whether a continuous contour line can be formed or not.

When deviation of horizontal coordinates for lung field contour proposed points positioned on the adjoining scanning lines is great, there is a high possibility of detecting erroneous lung field contour proposed points. Therefore, a straight line is obtained by a least square method from the position of each proposed point, and when the average distance from that straight line to each proposed point is great, all of the detected contour proposed points are made to be erroneous. It is preferable that a standard of judgment to decide that an average distance from the straight line to each proposed point is great is established to 5–20% of an average width of the subject region, and that the standard of judgment is changed depending on the state of contact between the subject region and the edge of the irradiation field. When the left and right edges of the subject region are hardly in contact with the edge of the irradiation field, it is preferable that the standard of judgment is established to 5–10% of an average width of the subject region, because the width of the subject region is considered to be almost the same as a width of a human body representing a subject. When only one of the left and right sides of the subject region is mostly in contact with the edge of the irradiation field, on the other hand, it is preferable to set the standard of judgment to 10–20% of an average width of the subject region, because of the high possibility that only a part of the subject is radiographed.

In this case, it is possible to judge the lung field contour correctly even in the case where contour proposed points in a small number only are erroneous, by repeating the same investigation several times excepting the contour proposed point having the maximum distance from the aforesaid straight line.

The number of times for the repetition is preferably the frequency obtained by deducting 10–20% or less of the detected lung field contour proposed points. The reason for the foregoing is that, if the number of times of the repetition is increased excessively and lung field contour proposed points are increased accordingly, the possibility of detecting erroneous lung field contour lines is raised A method of judging right and wrong based on the positional relationship of lung field contour proposed points includes also the following method.

Differences of horizontal coordinates of lung field contour proposed points which exist on adjoining scanning lines and are detected by scanning in the same direction are investigated in succession from the top. Then, the frequency wherein the difference is greater than the prescribed value is counted, and the maximum continuous number of the lung field contour proposed points where a difference of the horizontal coordinates is smaller than the prescribed value on the contrary is counted. As a result, when the number of the counting exceeds a fixed value, or when the maximum continuous number is short of the stipulated value, all of the lung field contour proposed points are made to be erroneous, and in other cases, only lung field contour proposed points included in the continuous portion are made to be correct, when the maximum continuous number of lung field contour proposed points are investigated.

In the case of the state where left and right edges of the subject region are mostly (for example, 80% or more) in contact with the edge of the irradiation field in accordance with area edge contact information, there is a high possibility that a contour of the lung field cannot be detected. Therefore, a border between the lung field and a diaphragm is detected by vertical direction border detecting means 612.

In the vertical direction border detecting means 612, signal changes are investigated by a plurality of different scanning lines which scan a subject in the vertical direction.

The signal change is investigated by a comparison between value Sv obtained by calculation of the following expression (3) and a threshold value that is set in advance.

$$Sv = \sum_i \sum_j Px+i, y+j-1 - \sum_i \sum_j Px+i, y+j \quad \text{(Numeral 3)}$$

In the same way as in the scanning in the horizontal direction, a range for obtaining the total of pixel values varies depending on a size of the subject region and a pruned image (original image in some cases), and the number of pixels corresponding to about 1–10 mm square in an actual size is desirable.

When a value Sv obtained by the expression above comes to a threshold value or more, it is detected as a lung field border proposed point. It is preferable that this threshold value is a value of about 10–50% per one pixel in terms of a logarithm ratio of an amount of radiation rays arriving at a detector, and it is desirable to establish it so that the threshold value may become smaller when a subject is smaller. The reason why the threshold value is greater than that in the horizontal direction is that the radiation absorption is greater than that in the lung field contour portion in the horizontal direction, and the signal difference from the lung field region becomes greater.

(6-2) Lung Field Region Proposed Detection:

In lung field region proposed detecting means 62 (not shown), when the lung field contour is detected by scanning in the horizontal direction, pixels which are surrounded by the lung field contour and have a pixel value higher than the threshold value obtained from the pixels on the lung field contour are detected as a lung field region. Further, when a lung field border is detected by the scanning in the vertical direction, pixels which are positioned on the upper portion of the lung field border and have a pixel value higher than the threshold value obtained from pixels on the lung field border are detected as a lung field region.

The threshold value obtained from pixels on the lung field contour, in this case, is assumed to be a value representing an average value per one pixel obtained by eliminating a coefficient of the third term in expression (1) or (2) on each scanning line and by dividing with the number of pixels.

Further, when two lung field contour proposed points on the left and on the right are found on the same scanning line, the value obtained by averaging the aforesaid threshold values on each lung field contour proposed point is made to be a threshold value anew.

Again, the threshold value obtained from the pixel on the lung field border is assumed to be a value representing an average value per one pixel obtained by eliminating a coefficient of the second term in expression (3) on each scanning line in the vertical direction and by dividing with the number of pixels.

Even in this case, it is desirable to change a method of judgment for the portion "surrounded by the lung field contour" by considering the outline information.

Figure 10:
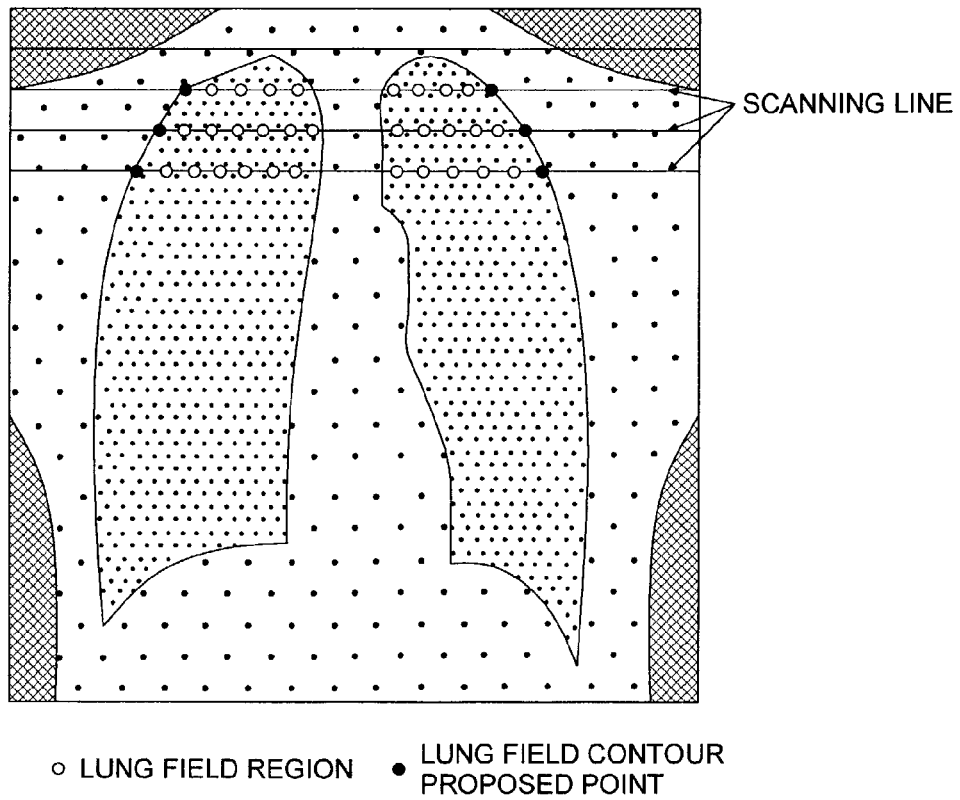
FIG. 10 is an illustration about detection of a lung field region in the present embodiment.

When the outline wherein a chest is radiographed as a primary subject on a high possibility is a "rectangle type" or the like, an area interposed between two lung field contour lines is made to be the area "surrounded by lung field contours" (see FIG. 10).

On the other hand, when the outline wherein a shoulder joint is radiographed as a primary subject on a high possibility is a "fan type", if one lung field contour line is found, an area surrounded by that lung field contour line and a subject region edge that is on the side opposite to a circular arc of the fan is made to be the area "surrounded by lung field contours" (see FIG. 11). By using the outline information as stated above, it is possible to make a range of investigation to look for the lung field region appropriate.

By investigating the state of distribution of pixels corresponding to the detected lung field region, it is possible to identify the image wherein a human body is radiographed from the front side and two lung field regions are radiographed separately, the image wherein a human body is radiographed from the side and lung field regions are superposed to be one, or the image wherein only one side on the left or right of a human body is radiographed from the front side and only one lung field region is radiographed. In that case, by picking up only the portion having the greatest number of pixels corresponding to the lung field region and by investigating the state of distribution of pixel signal values on the aforesaid portion, if the lung field is radiographed, it is possible to investigate about a portion included surely in the lung field, and to investigate the number of the lung field regions accurately.

To be concrete, the foregoing is as follows.

(6-2i) A subject region is divided vertically into n (n=3–5) equal parts, and the number of pixels judged to be the lung field region in each equally divided part is counted. In this case, each equally divided part may be established to be overlapped on an adjoining area.

(6-2ii) Among the equally divided parts stated above, the area having the greatest number of pixels judged to be the lung field region is investigated in the horizontal direction in terms of a profile of pixel signal values, and if there are two portions where the signal value is high, a judgment is formed that two lung field regions are radiographed, while, if there is one portion where the signal value is high, a judgment is formed that one lung field region is radiographed.

(6-3) Lung Field Region Right and Wrong Judgment:

In lung field region right and wrong judging means 63 (not shown), feature value obtained from signal values of the pixel detected as a lung field region are compared with feature value obtained from signal values of the pixel included in the area other than the aforesaid area, so that the detected lung field region may be judged whether it really is the lung field region or not.

As the feature value obtained from the lung field region, it is possible to use an average signal value of the pixel detected as the lung field region and to use a median.

As the feature value obtained from the outside of the lung field region, it is possible to use an average signal value of areas outside the other lung field region and to use a median.

The signal value in the lung field region is higher than that in the subject region other than the lung field region, because absorption of radiation is less in the lung field region. On the edge portion of the subject region, however, the signal value is sometimes high because a thickness of the subject is small. Therefore, feature value like those stated above are obtained, and if it is found that the signal value in the lung field region is higher than that in the outside of the lung field region, from the comparison between feature value obtained from the lung field region and those obtained from the outside of the lung field region, the lung field region obtained is judged to be right. If the signal value in the outside of the lung field region is higher, on the contrary, the lung field region obtained can be judged to be wrong.

In the lung field region detecting means 60, it is possible to investigate presence of a lung field region in the aforesaid way, and to output the result such as "no lung field region", "one lung field region" or "two lung field regions" as a feature. This feature is expressed as lung field region vector L. The lung field region vector L has three factors, including L [0]=5 for "no lung field region", L [1]=5 for "one lung field region" and L [2]=5 for "two lung field regions", and it is assumed that '0', is given to all factors other than those stated above.

Further, when distribution of pixels detected as a lung field region is one-sided to the upper portion or the lower portion of the subject region, it is considered that a part of the lung field region only is radiographed. To indicate this state, when 70% or more of the pixels detected as the lung field region are present in the equally divided area positioned at the upper portion or the lower portion, among areas equally divided vertically on the subject region, a value of L [0] corresponding to "no lung field region" is made to be '1'. Then, the value of L [0] is assumed to be increased by '1' each time the rate of pixels detected as a lung field region in the equally divided area is increased by 10%. As the value of L [0] is increased, a value of L [1] or of L [2] is reduced so that the total value of factors of lung field region vector L may constantly be '5'.

In this case, the total value is set to be '5' so that consistency with outline vector S may be obtained. The feature value thus obtained (lung field region vector L) are transmitted to feature evaluating means 80.

(7) Edge Pattern Recognition:

Since an amount of absorption for radiation varies depending on the difference of fabric composition on the border between a bone portion and a soft tissue, signal values of pixels on the areas running on both sides of the border are greatly different from each other. Therefore, the pixel positioned on the border between the bone portion and the soft tissue becomes an edge pixel having a big difference of signal from neighboring pixels. Thus, edge pattern recognizing means 70 investigates signal change between neighboring pixels to extract the edge pixel, and by investigating its distribution, it is possible to grasp the existence of these fabrics.

Incidentally, the edge pattern recognizing means 70 that is not illustrated in FIG. 1 is assumed to be composed of edge extracting means 71, edge concentration degree calculating means 72 and edge pattern discriminating means 73, which will be explained in succession as follows.

(7-1) Edge Extracting:

A method to obtain a signal change between neighboring pixels through the edge extracting means 71 includes a method based on primary differential and a method based on secondary differential. When the secondary differential is used, it is difficult to detect a monotonous change in thickness of a human body, and a change in composition can be caught on a high fidelity basis. On the edge extracting means 51, therefore, edge pixels wherein a signal change between neighboring pixels is great are extracted.

(7-1a) In the pruned image, arithmetic processing is conducted on each pixel Px,y (x: coordinate value in horizontal direction, y: coordinate value in vertical direction) included in the subject region, by using each of four types of filters shown in FIGS. 12(*a*), 12(*b*), 12(*c*) and 12(*d*). Edge intensity information Qx,y obtained as a result of the arithmetic processing is expressed by the following expression (4).

$$Qx, y = a \max\left(\sum_i \sum_j Px+i, y+j \cdot Mni, j\right) \quad \text{(Numeral 4)}$$

In the above expression, Mni,j represents a value of each filter (n=1, 2, 3 and 4). The term a max ( ) shows that absolute values among results of arithmetic processing by the use of the filter are compared, and the maximum absolute value is made to be Qx,y. A value of each pixel of Mni,j is made to be a numerical value described in each box of each filter shown in FIG. 12.

Further, in the case of conducting the aforesaid arithmetic processing on the image edge portion, when a pixel to be multiplied by a filter value is outside the image and is not present, a value of a central pixel of the filter processing is substituted imaginarily in the pixel to be out of the image, for arithmetic processing.

(7-1b) Further, in the aforesaid arithmetic processing, the number n corresponding to the filter selected by a max ( ) is stored in edge direction information Dx,y as Dx,y=n, for each pixel. The direction information Dx,y serves as an index indicating the direction of the edge in its pixel. In the case of an example of n=1, it shows the edge in the horizontal direction, and in the case of n=2, it shows the edge in the vertical direction.

(7-1c) In the pixel having important information such as an edge of a bone, a signal change between neighboring pixels is big. Therefore, by extracting only pixels each having great edge intensity, important edge information can be obtained.

Values of the Qx,y mentioned above are totalized for all images, and each pixel is discriminated whether it belongs to α% of the total from the greater value of Qx,y, and the results thereof are preserved in edge selection information Lx,y. The Lx,y is expressed under the following value.

Lx,y=1 (within α% of the total in the order from the greater value of Qx,y)

Lx,y=0 (not satisfying the condition of within α% of the total in the order from the greater value of Qx,y)

For obtaining necessary edge information correctly, the α% is preferably 5–40%. Since it is considered that an area of a bone portion included in a subject is increased when the subject is relatively smaller, it is preferable that the value of α is changed depending on a size of the subject region so that the value of α may be greater when the subject region is smaller. The size of the subject region can be evaluated by obtaining the total of the pixels each having a pixel value of '1', in the aforesaid area indicating image.

Edge direction information Dx,y, edge selection information Lx,y and edge intensity information Qx,y all obtained by the present means are transmitted to edge concentration degree calculating means 72 as signal change information.

(7-2) Edge Concentration Degree Calculation:

In the edge concentration degree calculating means 72, edge continuity and edge concentration degree are investigated from the obtained edge direction information Dx,y, edge selection information Lx,y and edge intensity information Qx,y.

Figure 13:
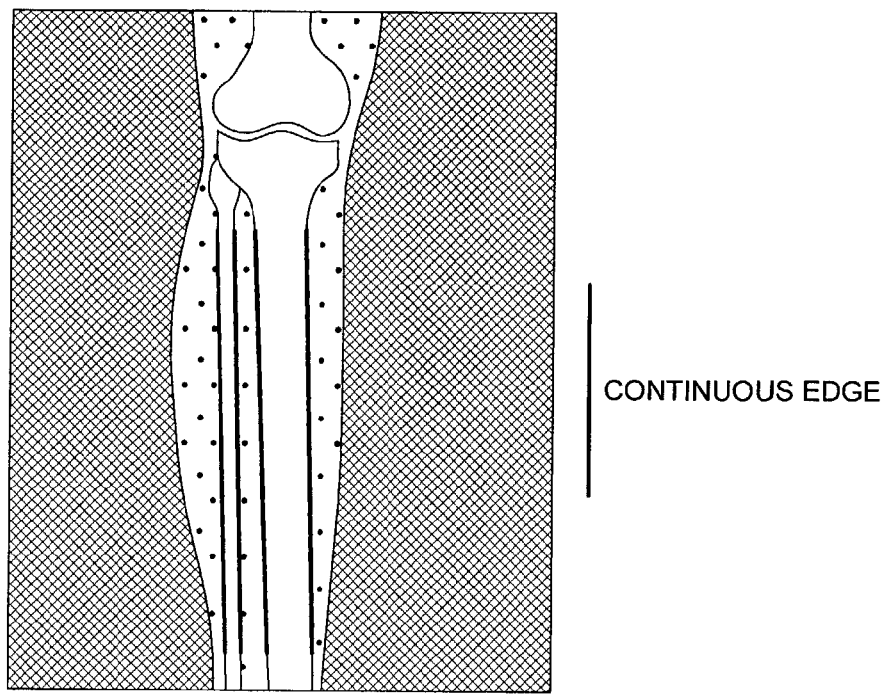
FIGS. 13(*a*) to 13(*b*) each is an illustration of "a long bone" representing a feature of an edge pattern in the present embodiment.
Figure 13:
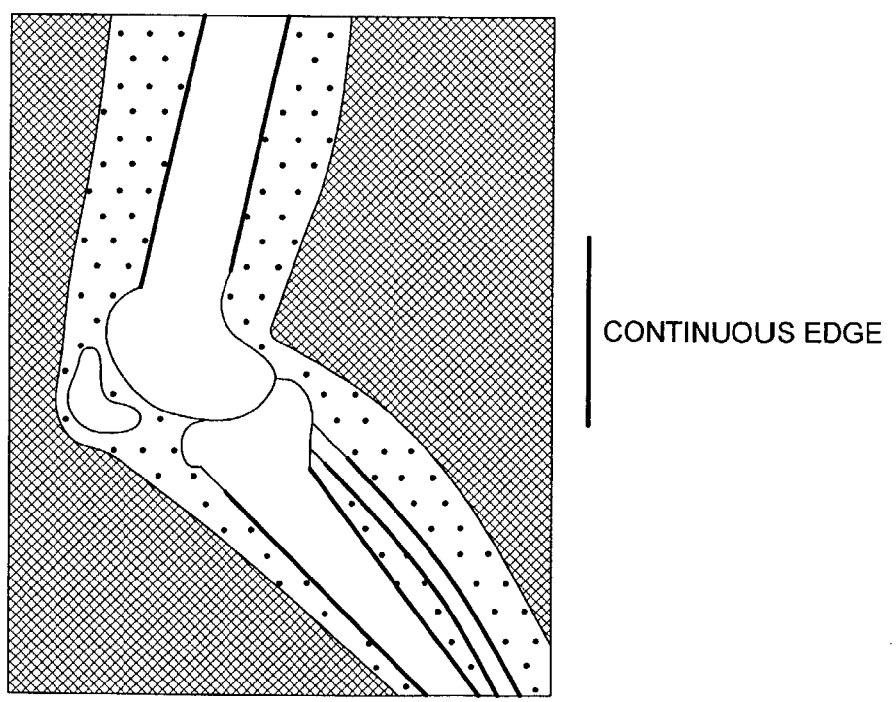

When a human body is radiographed, characteristic patterns are generated depending on a region representing a subject and on the radiographing direction. When a subject is represented by bones of limbs such as a leg image shown in each of FIGS. 13(a) and 13(b), as an example, intensity is relatively great along a border line of bones, and an edge having a component in the direction perpendicular to the border line exists continuously.

The edge continued in the same direction like this appears also on the contour of a lung field and on an edge of a jawbone.

Figure 14:
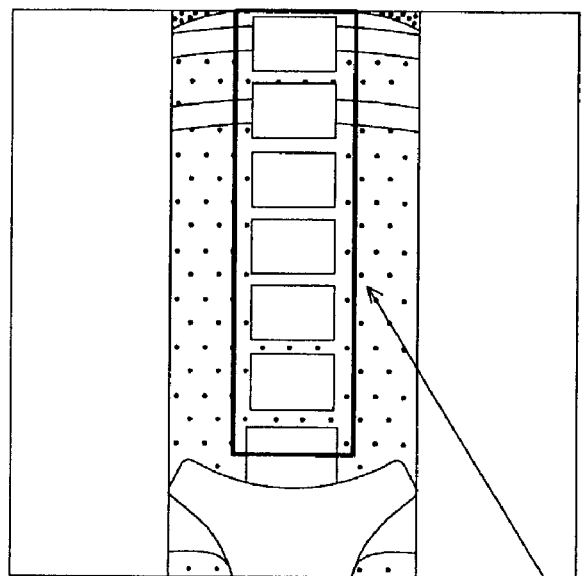
FIGS. 14(*a*) to 14(*b*) each is an illustration of "a spine" representing a feature of an edge pattern in the present embodiment.
Figure 14:
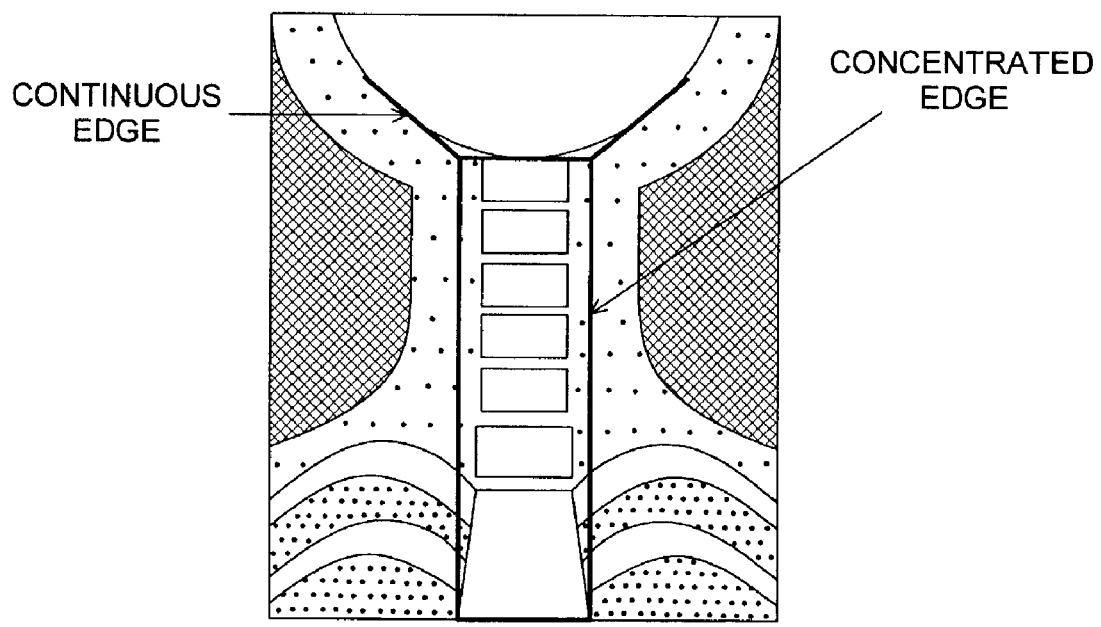

When a spine is a main subject like a lumbar image and a cervical spine image shown respectively in FIGS. 14(a) and 14(b), edges each having a great intensity are concentrated on the spine portion because the spine is an aggregate of small bones, but, there is no consistency in directions of the edges.

Therefore, by obtaining edge continuity and edge concentration degree such as "continuous edges in the same direction" (appearing on bones of limbs and on lung field contour) and "edge concentration lines in different directions" (appearing on spine portion), information useful for recognizing regions of the subject can be obtained.

(7-2a) Extraction of Continuous Edges in the Same Direction:

(7-2a-1) In target pixel Ix,y representing Lx,y, with respect to both adjoining pixels Ii,j and Ik,l in the direction perpendicular to the edge direction shown in Dx,y, a value of Lx,y is increased by '1' when they have edge components in the same direction and Li,j=1 and Lk,l=1 hold similarly to Ix,y.

(7-2a-2) Next, in the same way as in (7-2a-1) regarding target pixel Jx,y representing Lx,y=2, with respect to both adjoining pixels Ji,j and Jk,l in the direction perpendicular to the edge direction shown in Dx,y, a value of Lx,y is further increased by '1' when they have edge components in the same direction and Li,j=2 and Lk,l=2 hold similarly to Jx,y.

(7-2a-3) The processing of (7-2a-2) is repeated m times.

Then, when edges in quantity of (m+2) or more which are in the same direction and have intensity at a certain level or higher are continued, Lx,y=m+1 holds on the pixel at the center of the continuous edges. Then, a value of Lx,y for an optional pixel is compared with threshold value Thd1 established in advance, and when the following expression holds, Numeral 5

$$Lx,y > Thd1 \quad (5)$$

the pattern of "continuous edges in the same direction" is extracted. In this case, it is preferable that the threshold value Thd1 takes a value corresponding to about 5–20 cm in an actual size of the subject.

The extracted pattern is stored in arrangement Al[u] (u=0, 1, . . . ) as a coordinate value (a coordinate value of the pixel satisfying the expression (5) above, a value of any one pixel when a plurality of pixels exist to be close each other) of the center pixel of the pattern. In addition, the number of the extracted patterns is stored in an element of v=0 in arrangement B[v].

For shortening a period of time for calculation, the following method may also be taken in place of the methods shown in (7-2a-1)–(7-2a-3)

(7-2a-4) The image is divided into plural small areas. Each small area is preferably about 3×3–10×10 pixels.

(7-2a-5) For each small area, the number of pixels wherein Lx,y=1 holds for pixels included in the small area is totaled for each edge direction shown on Dx,y, and is stored in Cn (n=1, 2, 3 and 4). In this case, n is the same as an index in the edge direction which the Dx,y has.

(7-2a-6) Based on the results of totaling in aforementioned (7-2a-5), when the number of edge components Ck in specific directions k (k=1, 2, 3 and 4) is great, and when they have values of a certain level or higher, for an optional small area, the small area is assumed to include the pattern of "continuous edges in the same direction". In this case, an optional pixel (example: a center of the area, or, a center of gravity of the pixel satisfying Lx,y=1) included in that small area is stored in the arrangement A1.

Further, it is also possible to employ a method wherein the methods in the (7-2a-1)–(7-2a-3) and the methods in the (7-2a-4)–(7-2a-6) are united, and a pattern of "continuous edges in the same direction" is to be included in the small area wherein there are present many Lx,y>a (a: optional value greater than 0) obtained in (7-2a-1)–(7-2a-3).

(7-2b) Extraction of edge concentration lines in different directions:

(7-2b-1) The image is divided into plural small areas. Each small area is preferably about 3×3–10×10 pixels.

(7-2b-2) For each small area, the number of pixels wherein Lx,y=1 holds for pixels included in the small area is totaled for each edge direction shown on Dx,y, and is stored in Cn (n=1, 2, 3 and 4). In this case, n is the same as an index in the edge direction which the Dx,y has. Further, a total of each Cn is stored in C0.

(7-2b-3) When small areas where C0 comes to a value greater than threshold value Thd2 established in advance exist linearly and continuously to be in quantity of Thd3 or more, these small areas are extracted.

(7-2b-4) Cn of each of small areas extracted in the (7-2b-3) is totaled for each value of n, and when the number of edge components in specific directions only becomes large, the pattern of "edge concentration lines in different directions" is detected on a portion shown by the extracted small areas.

The extracted pattern stores, on arrangement A2, a coordinate value of the specific pixel in each of the small areas existing on both end portions among the aforesaid extracted small areas. In addition, a value of '1' is stored in an element of v=1 of arrangement B[v]. When "edge concentration lines in different directions" are not detected, B[1]=0 is made to hold.

Further, as a means to judge whether the number of edge direction components in specific direction among plural edge direction components in the aforementioned (7-2a-6) or (7-2b-4) is large or not, there are available a statistical method such as an x2 test and a method by a simple judgment, such as a judgment whether the number of specific direction components among the total number occupies a certain rate or not.

(7-3) Edge Pattern Distinction:

Edge pattern discriminating means 73 can extract feature value based on patterns obtained by edge concentration degree calculating means 72.

In a simple way, values of aforesaid A1, A2 and B may be extracted as they are as the feature value. However, by considering combination of the number and positions of the detected patterns, feature value which are more significant can be extracted.

For example, in the case of bones having a relatively long length as in bones of limbs, the pattern of "continuous edges in the same direction" is detected on both sides of the bone. Therefore, when two "continuous edges in the same direction" exist to be close to and to be in parallel with each other, the edge pattern is extracted as, for example, "a long bone".

In the case of a cervical spine, on the other hand, only one of "continuous edges in the same direction" exists on the contour of a jawbone. Further, in the chest, "continuous edges in the same direction" are detected on the contour of the lung field, and they exist on remote positions. Therefore, an edge pattern is extracted as "a contour". Further, the number of the detected "continuous edges in the same direction" and the direction of the subject inclined from its longitudinal direction may be used for classification.

Further, in the lumbar, when there are "edge concentration lines in different directions", the edge pattern is made to be a spine because "edge concentration lines in different directions" can be detected on the spine portion. In addition to this, patterns may also be classified at the position of "edge concentration lines in different directions" occupying in the subject region. The results of the classification such as the "long bone", "contour" and the "spine" are stored in edge pattern vector E that is similar to form vector S. Each element of the edge pattern vector E takes, for example, the following values.

E[0]=5 for existence of a "long bone"
E[1]=5 for existence of a "contour"
E[2]=5 for existence of a "spine"
E[3]=5 for absence of a "long bone" and a "spine"

This edge pattern vector E is edge pattern information indicating feature value by edge pattern, and it is transmitted to feature evaluating means 80 as output of edge pattern recognizing means 70.

8. EXAMPLES (8) Feature Evaluating Means 80

When the feature value obtained by each feature value extracting means is always correct, when estimating from the feature value which are considered to be obtained in the case of the radiographed region, it is possible to identify the radiographed region on a relatively high accuracy basis, by using all feature value obtained.

However, there is sometimes considered a possibility of extracting wrong feature value.

An example of the foregoing is an occasion wherein the result of detection for the lung field region shows feature value of "two lung field regions" which is not considered in the case of a head, despite of the fact that the feature based on the outline is a "barrel type" that is obtained when the radiographed region is a head.

By combining feature value obtained by each feature value extracting means and by investigating consistency, it is possible to specify, to a certain extent, the feature value which are considered to be wrong. Then, by extracting feature value again by changing conditions, regarding the feature value specified to be wrong, more accurate information can be obtained, resulting in an improvement of accuracy for recognizing radiographed regions.

When there are no feature value which are decisive for identifying radiographed regions of the subject in the feature value obtained by each feature value extracting means, the accuracy for recognizing the radiographed regions has to be low. The decisive feature value mentioned in this case mean the feature value with which the radiographed regions can be identified mostly by the feature value. For example, in the case of the feature value based on outlines, feature value representing a "barrel type" judged to be a head and feature value representing a "boomerang type" judged to be an elbow and a knee joint are applicable, and in the case of detection of a lung field region, feature value representing "two lung field regions" judged to be a chest are applicable.

In the feature evaluating means 80, when the combination of feature value which are not coordinated is obtained by the following procedures and when decisive feature value do not exist, instructions are given to one or plural feature extracting means so that feature extraction is conducted again.

When the feature value extracted again are obtained, the feature value are evaluated again. After that, when decisive feature value are not still obtained, extraction of feature value is further conducted again. When the decisive feature value are obtained, or when the number of times for repetition of feature extraction arrives at the prescribed number, each feature value is transmitted to subject recognizing means 90.

(8-1) Flow of Processing in Feature Evaluating Means

A group of obtained feature value and an evaluating vector that is called from storage means 82 and evaluates their combination are transmitted to evaluating means 82. In the evaluating means 82, a correlative operation is conducted between the group of feature value and all evaluation vectors. A rerun of feature extraction is decided by the results of the correlative operation, and when the rerun is needed, the feature extracting means to conduct feature extraction again is specified by rerun designating means 83.

(8-1) Storage Means 81

In the storage means 81, a list of combination wherein a combination of feature value is not coordinated is stored as evaluation vector $Vn$ (n=1, 2, ...). The evaluation vector $Vn$ is a vector having an element wherein the number of elements of feature vector (outline vector, lung field region vector or the like) obtained by each feature value extracting means. Each element of the evaluation vector $Vn$ corresponds to an element of feature vector of each feature value on a one to one correspondence basis. For example, the evaluation vector $Vn$ is a vector wherein elements each corresponding respectively to each element of outline vector S, lung field region vector L and edge pattern vector E are arranged in succession.

$$Vn=(S(=\{S[0],S[1],\ldots\}),L(=\{L[0],L[1],\ldots\}),\\ E(=\{E[0],E[1],\ldots\}))$$

Only elements which are not coordinated have a value of '1', and other elements have a value of '0'. Further, in the storage means 81, there is stored a list of combination of each feature value that corresponds to the occasion wherein no decisive feature is obtained. For example, the list is stored in each feature value evaluating vector shown below.

Outline: There is indicated a list of feature value wherein outline vector S and feature evaluating vector Sd in the same size are not decisive, and vector Sd has a value of '0' for the element indicating the feature corresponding to the decisive feature such as a "barrel type" or a "boomerang type" as its element, and it has a value of '1' for the element corresponding to other feature value.

Lung field region: Similarly to the outline, there is indicated a list of feature value wherein lung field region vector L and feature evaluating vector Ld in the same size are not decisive, and regarding a value of the element, element Ld[2] corresponding to "two lung field regions" only has a value of '0' and elements corresponding to other feature value have '1'.

Edge pattern: There is indicated a list of feature value wherein edge pattern vector E and feature evaluating vector Ed in the same size are not decisive, and regarding a value of the element, element Ed[0] corresponding to "long bone" only has a value of '0' and elements corresponding to other feature value have '1'.

Further, in the storage means 81, there is stored a list showing feature extracting means for rerun in quantity of (the number of the evaluation vector Vn+1), and the feature extracting means for rerun are specified, referring to this list. This list is transmitted to rerun designating means 83.

These evaluation vectors stored in the storage means 81 are determined as initial information in advance and stored, and in case of need, addition, elimination and modification of the evaluation vectors can be conducted based on experiences.

(8-2) Evaluation Means 82

In the evaluation means 82, when each feature value is obtained, each feature value evaluating vector Vn, Sd, Ld and Ed are called from the storage means 81, and correlative operation is conducted with a vector indicating each corresponding feature. In this case, from each feature value vector, there is prepared vector F in which the elements of the feature vectors are arranged in succession. In this case, F is one corresponding to the feature evaluating vector Vn, and it has the following structure.

$$F=(S(=\{S[0],S[1],\ldots\}),L(=\{L[0],L[1],\ldots\}),\\ E(=\{E[0],E[1],\ldots\}))$$

Then, the correlative operation is carried out as follows to obtain correlative value Cn (n=1, 2, ...)

$$Cn=(Vnt \cdot F) \qquad (6)$$

Incidentally, the maximum number of the existing correlative values Cn is the same as the number of the feature evaluating vectors Vn. Then, the aforesaid operation is finished when Cn>0 holds, or when calculations in the quantity of the feature evaluating vectors have been carried out. When Cn>0 holds, it corresponds to the combination of inconsistent feature value. Thus, the following information is transmitted to rerun designating means 83.

Each feature value S, L and E

Number n of the feature evaluating vector causing Cn >0

Next, when the correlative value causing Cn>0 does not exist, the following correlative operation is conducted.

$$C=(Sdt \cdot S) \cdot (Ldt \cdot L) \cdot (Edt \cdot E) \qquad (7)$$

When C=0 holds as a result of the aforementioned operation, each feature value is transmitted to subject recognizing means 90 under the assumption that decisive feature value have been obtained. However, in the case of C>0, the feature extracting means for rerunning is specified by rerun designating means 83, because decisive feature value have not been obtained. In this case, the following pieces of information are transmitted to the rerun designating means 83.

Each feature value S, L and E

A value of '0' as one corresponding to the number n of the feature evaluating vector The number of times of evaluations is stored in a register memory or the like. In order to avoid an infinite loop, when the number of times for evaluation exceeds the prescribed frequency established in advance, feature value are not extracted again even in the case of Cn>0 or C>0, and each feature value is transmitted to subject recognizing means 90.

(8-3) Rerun Designating Means 83

In the rerun designating means 83, the feature extracting means for rerunning is specified by a combination of each feature value obtained.

With respect to the specification of the feature extracting means for rerunning, a certain specific combination is stored fixedly, and when feature value corresponding to the stored combination are obtained, a command to extract feature value again is given to the feature extracting means to be designated by the combination.

In the case of the present example, the feature extracting means for rerunning is specified to correspond to the number n (n=0, 1, 2, . . . ) of the feature evaluating vector causing Cn>0 mentioned above.

In this case, a list of feature evaluating means which rerun for each number n obtained from the storage means 81 is referred. The list stated above exists to correspond to the above-mentioned number n, with (rerun judgment information for outline Rs, rerun judgment information for lung field region Rl and rerun judgment information for edge pattern Re) as one combination.

When each value of Rs, Rl and Re is 'r' (r=1, 2, 3, . . . ), a command for rerunning is given together with a value of Rs or the like to the feature extracting means corresponding to the each value. If each value of Rs, Rl and Re is '0', rerunning is not conducted and feature value are preserved as they are. Incidentally, an effect in the case of a different value of 'r' will be explained later.

At the point of time when feature value obtained by rerunning are secured, the preserved feature value are returned to evaluating means 82 and the feature value are evaluated again.

When feature value are extracted again, conditions for extracting feature value are changed, because feature value need to be extracted based on changes which are more minute. For example, in outline recognizing means 40, it is possible to make judgment to a "barrel type" to be easier than judgment to a "rectangle type", by lowering a value of the evaluation threshold value for a value of the total of depths of the pole for extracting feature value as a "barrel type" and a "sandglass type".

In the same way, in lung field region detecting means 60, it is possible to make detection of the lung field region easy, by lowering the threshold value for evaluating Sh and Sv which are used for detection of a lung field contour proposed point and a lung field border proposed point.

In edge pattern recognizing means 70, it is possible to make extraction of feature value such as A "long bone" and a "spine" to be easy, by increasing the rate of pixels to be taken out as an edge pixel, or by lowering the threshold value for extracting "continuous edges in the same direction".

On the contrary, when wrong feature value are considered to be extracted and extraction of feature value is conducted again accordingly, the threshold value is changed so that feature value such as a "barrel type" and a "long bone" may become difficult to obtain, which is opposite to the foregoing.

As stated above, when extraction of feature value is executed again, one or plural threshold values are changed to the purpose on each feature value extracting means. The switching of threshold values can be conducted by judgment information values Rs and Rl of the rerun command stated above. For example, in each feature value extracting means, some kinds of parameter sets are stored a set of one or plural threshold values, so that they may correspond to values of Rs and Rl transmitted together with the rerun command on a one to one correspondence basis. When the rerun command is given, a set of threshold values corresponding to values of Rs and Rl is called, and these threshold values are used to extract feature value. For example, let it be assumed that a value of Rs takes an integer of 0 and 1–5. When Rs=0 holds, a feature for the outline is not extracted again. When Rs=1–5 holds, a feature about the outline is extracted for the outline. In that case, however, a threshold value parameter that easily extracts a decisive feature such as a "barrel type" is selected when a value of Rs is greater, and a threshold value parameter that is difficult to extract a decisive feature is selected when a value of Rs is smaller, on the contrary, thus, extraction of feature value is conducted. Incidentally, for the first extraction of feature value, a medium threshold value parameter that corresponds to Rs=3 is used.

For switching of threshold values, there also is a method to switch by conducting condition judgment by a value of Rs inside each feature value extracting means, in addition to the method wherein threshold values are stored as a parameter set as stated above. In this method by condition judgment, it is also possible to change a partial processing itself by the use of a value of Rs, in addition to changing threshold values simply.

(9) Subject Recognition:

A radiographed region of a subject or the radiographing direction is recognized based on the feature value obtained. Recognition of the radiographed region of a subject can be conducted by subject recognizing means 90 through the method described in each of TOKKAI Nos. 2001-76141 and 2001-224576.

To be concrete, each feature value obtained by each of outline information, area edge contact information, lung field information and edge pattern information is made to be a feature vector having an element of the feature. On the other hand, a subject vector indicating a feature of a subject for each radiographed region and for each radiographing direction is established in advance. Each subject vector has, as an element of vector, the correlative relationship wherein the higher the correlation is, the higher the score is, for each feature value.

Then, the correlative operation is conducted by the obtained feature vector and by each subject vector, so that a degree of correlation is calculated, and a subject is recognized as the radiographed region and radiographing direction corresponding to the subject vector having the highest degree of correlation.

As explained in detail above, in the method of the invention to recognize a radiographed region and a radiographing direction for a subject by combination of some feature value such as a form of a subject region, a state of distribution of edge pixels caused by signal changes between neighboring pixels and existence of a lung field to be detected based on density changes, it is possible to obtain accurate feature value and thereby to recognize accurately a radiographed region and a radiographing direction for a subject, for broad and various radiographed regions from a head to bones of limbs, by investigating minute changes and by obtaining decisive feature value, when decisive feature value are not obtained in a single extraction of feature value.

What is claimed is:

1. A feature extracting method for a radiation image formed by radiation image signals each corresponding to an amount of radiation that has passed through a radiographed subject, said method comprising:

a plurality of different feature extracting steps, each of which has a respective feature extracting condition to extract a respective feature value so that a plurality of different feature values are extracted from the radiation image by the plurality of different feature extracting steps;

a feature value evaluating step of evaluating a combination of the plurality of different feature values extracted by the plurality of different feature extracting steps; and a controlling step of: selecting at least one feature extracting step from the plurality of different feature extracting steps based on an evaluation result by the feature value evaluating step, changing the feature extracting condition of the selected feature extracting step, and conducting the selected feature extracting step again so as to extract from the radiation image a feature value based on the changed feature extracting condition;

wherein the controlling step includes investigating the coordination of the combination of the plurality of different feature values, and when it is judged in the controlling step that the combination of the plurality of different feature values is not coordinated, the feature value to be extracted again is selected based on the uncoordinated combination of the plurality of different feature values and conducts the selected feature extracting step again.

2. The feature extracting method of claim 1, further comprising:

a subject region extracting step of extracting a subject region representing the radiographed subject from a radiographed image region, wherein the plurality of different feature values are extracted from the subject region extracted by the subject region extracting step.

3. The feature extracting method of claim 2, wherein the plurality of different feature extracting steps comprises an outline recognizing step of extracting a feature value based on an outline of the subject region which is obtained by investigating an outline of the subject region.

4. The feature extracting method of claim 1, wherein the plurality of different feature extracting steps comprises an edge pattern recognizing step of investigating signal intensity variations among neighboring pixels around an arbitrarily selected pixel on the radiation image, determining an arbitrarily selected pixel having a large signal intensity variation as an edge pixel, and extracting a feature value based on a distribution of edge pixels.

5. The feature extracting method of claim 1, wherein the plurality of different feature extracting steps comprises a lung field region detecting step of investigating whether or not a lung field region exists on the radiation image and extracting a feature value based on a result of the investigation.

6. The feature extracting method of claim 1, wherein when it is recognized in the controlling step that there is a determinant feature to specify the radiographed subject in the combination of the plurality of different feature values, no feature is extracted again in the controlling step.

7. The feature extracting method of claim 1, wherein the controlling step includes consulting a list of uncoordinated combinations of a plurality of different feature values, and a feature value to be selected to be extracted again is predetermined for each of the uncoordinated combinations.

8. The feature extracting method of claim 1, wherein the feature extracting condition of each of the plurality of different feature extracting steps includes a plurality of threshold conditions to determine a feature value, and wherein the feature extracting condition changing in the controlling step comprises the threshold condition of the selected feature extracting step and the selected feature extracting step is conducted again so as to extract the feature value by using the changed threshold condition.

9. A method of recognizing a subject from a radiation image formed by radiation image signals each corresponding to an amount of radiation that has passed through a radiographed subject, said method comprising:

a plurality of different feature extracting steps, each of which has a respective feature extracting condition to extract a respective feature value so that a plurality of different feature values are extracted from the radiation image by the plurality of different feature extracting steps;

a feature value evaluating step of evaluating a combination of the plurality of different feature values extracted by the plurality of different feature extracting steps;

a controlling step of: selecting at least one feature extracting step from the plurality of different feature extracting steps based on an evaluation result by the feature value evaluating step, changing the feature extracting condition of the selected feature extracting step, and conducting the selected feature extracting step again so as to extract from the radiation image a feature value based on the changed feature extracting condition; and a recognizing step of recognizing a radiographing orientation and a radiographed part of the subject on the radiation image by using the plurality of different feature values;

wherein the controlling step includes investigating the coordination of the combination of the plurality of different feature values, and when it is judged in the controlling step that the combination of the plurality of different feature values is not coordinated, the feature value to be extracted again is selected based on the uncoordinated combination of the plurality of different feature values and conducts the selected feature extracting step again.

10. The method of claim 9, wherein the plurality of different feature extracting steps comprises an outline recognizing step, an edge pattern recognizing step and a lung field region detecting step.

11. The method of claim 9, wherein when it is recognized in the controlling step that there is a determinant feature to specify the radiographed subject in the combination of the plurality of different feature values, no feature is extracted again in the controlling step.

12. A computer system for conducting a feature extracting method for a radiation image formed by radiation image signals each corresponding to an amount of radiation that has passed through a radiographed subject, the computer system including a program that is executable by the computer system to cause the computer system to execute functions comprising:

a plurality of different feature extracting steps, each of which has a respective feature extracting condition to extract a respective feature value so that a plurality of different feature values are extracted from the radiation image by the plurality of different feature extracting steps;

a feature value evaluating step of evaluating a combination of the plurality of different feature values extracted by the plurality of different feature extracting steps; and a controlling step of: selecting at least one feature extracting step from the plurality of different feature extracting steps based on an evaluation result by the feature value evaluating step, changing the feature extracting condition of the selected feature extracting step, and conducting the selected feature extracting step again so as to extract from the radiation image a feature value based on the changed feature extracting condition;

wherein the controlling step includes investigating the coordination of the combination of the plurality of different feature values, and when it is judged in the controlling step that the combination of the plurality of different feature values is not coordinated, the feature value to be extracted again is selected based on the uncoordinated combination of the plurality of different feature values and conducts the selected feature extracting step again.

13. The computer system of claim 12, wherein the plurality of different feature extracting steps comprises an outline recognizing step, an edge pattern recognizing step and a lung field region detecting step.

14. The computer system of claim 12, wherein when it is recognized in the controlling step that there is a determinant feature to specify the radiographed subject in the combination of the plurality of different feature values, no feature is extracted again in the controlling step.

15. An image processing apparatus for processing a radiation image formed by radiation image signals each corresponding to an amount of radiation having that has passed through a radiographed subject, said apparatus comprising:
- a plurality of different feature extracting sections, each of which has a respective feature extracting condition to extract a respective feature value so that a plurality of different feature values are extracted from the radiation image by the plurality of different feature extracting sections;
- a feature value evaluating section to evaluate a combination of the plurality of different feature values extracted by the plurality of different feature extracting sections; and
- a controlling section to select at least one feature extracting section from the plurality of different feature extracting sections based on an evaluation result by the feature value evaluating section, to change the feature extracting condition of the selected feature extracting section, and to control the selected feature extracting section so as to extract from the radiation image a feature value again based on the changed feature extracting condition;
- wherein the controlling section investigates the coordination of the combination of the plurality of different feature values and when the controlling section judges that the combination of the plurality of different feature values is not coordinated, the controlling section selects the feature value to be extracted again based on the uncoordinated combination of the plurality of different feature values and controls the selected feature extracting section to select the selected feature value again.

16. The image processing apparatus of claim 15, further comprising:
- a subject region extracting section of which extracts a subject region representing the radiographed subject from a radiographed image region,
- wherein the plurality of different feature values are extracted from the subject region extracted by the subject region extracting section.

17. The image processing apparatus of claim 15, wherein the plurality of different feature extracting sections comprises an outline recognizing section which extracts a feature value based on an outline of the subject region which is obtained by investigating the outline of the subject region.

18. The image processing apparatus of claim 15, wherein the plurality of different feature extracting sections comprises an edge pattern recognizing section which investigates signal intensity variations among neighboring pixels around an arbitrarily selected pixel on the radiation image, determines an arbitrarily selected pixel having a large signal intensity variation as an edge pixel, and extracts a feature value based on a distribution of edge pixels.

19. The image processing apparatus of claim 15, wherein the plurality of different feature extracting sections comprises a lung field region detecting section which investigates whether or not a lung field region is present on the radiation image and extracts a feature value based on a result of the investigation.

20. The image processing apparatus of claim 15, wherein when the controlling section recognizes that there is a determinant feature to specify the radiographed subject in the combination of the plural different feature values, the controlling section a does not extract a feature value again.

21. The image processing apparatus of claim 15, wherein the controlling section includes a list of uncoordinated combinations of a plurality of different feature values, and a feature value to be selected to be extracted again is predetermined for each of the uncoordinated combinations.

22. The image processing apparatus of claim 15, wherein the feature extracting condition of each of the plurality of different feature extracting sections includes a plurality of threshold conditions to determine a feature value, and wherein the controlling section changes the threshold condition of the selected feature extracting section and controls the selected feature extracting section so as to extract the feature value again by using the changed threshold condition.

* * * * *